(12) United States Patent
Sao et al.

(10) Patent No.: US 7,553,357 B2
(45) Date of Patent: *Jun. 30, 2009

(54) INK COMPOSITION, INK CARTRIDGE, RECORDING METHOD, AND RECORDED PRODUCT

(75) Inventors: Akihito Sao, Matsumoto (JP); Hiroshi Fukumoto, Shiojiri (JP); Kazuhiko Kitamura, Matsumoto (JP)

(73) Assignee: IKO Epson Corporation, Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 11/800,659

(22) Filed: May 7, 2007

(65) Prior Publication Data
US 2007/0261597 A1  Nov. 15, 2007

(30) Foreign Application Priority Data
May 12, 2006  (JP)  ............... 2006-133572
Nov. 15, 2006  (JP)  ............... 2006-309416

(51) Int. Cl.
*C09D 11/02*  (2006.01)
*B41J 2/01*  (2006.01)

(52) U.S. Cl. ............. 106/31.43; 106/31.48; 106/31.58; 106/31.59; 106/31.75; 106/31.86; 106/31.89; 347/100

(58) Field of Classification Search ............ 106/31.43, 106/31.48, 31.58, 31.59, 31.75, 31.86, 31.89; 347/100
See application file for complete search history.

(56) References Cited

U.S. PATENT DOCUMENTS

| | | | | |
|---|---|---|---|---|
| 6,821,329 | B2 * | 11/2004 | Choy ................... | 106/31.58 |
| 7,048,789 | B2 * | 5/2006 | Taguchi et al. ......... | 106/31.43 |
| 7,077,894 | B2 * | 7/2006 | Taguchi et al. ......... | 106/31.43 |
| 7,404,851 | B2 * | 7/2008 | Arai .................... | 106/31.48 |
| 7,416,592 | B2 * | 8/2008 | Kitamura et al. ........ | 106/31.48 |
| 2007/0261597 | A1 * | 11/2007 | Sao et al. .............. | 106/38 |
| 2007/0263058 | A1 * | 11/2007 | Sao et al. .............. | 106/31.43 |
| 2007/0265376 | A1 * | 11/2007 | Sao et al. .............. | 524/160 |
| 2008/0145562 | A1 * | 6/2008 | Kitamura et al. ........ | 106/31.48 |
| 2008/0220168 | A1 * | 9/2008 | Sao et al. .............. | 106/31.13 |

FOREIGN PATENT DOCUMENTS

| | | |
|---|---|---|
| JP | 2003-292850 | 10/2003 |
| JP | 2004-315739 | 11/2004 |
| JP | 2005-187790 | 7/2005 |
| JP | 2005-298744 | 10/2006 |
| JP | 2007-191650 | 8/2007 |

OTHER PUBLICATIONS

Patent Abstract of Japan of JP 2004-315739 dated Nov. 11, 2004.
Patent Abstract of Japan of JP 2005-188790 dated Jul. 14, 2005.
Patent Abstract of Japanese Patent No. 2007-191650 dated Aug. 2, 2007.
Patent Abstract of Japanese Patent No. 2005-298744 dated Oct. 27, 2005.
Patent Abstract of Japanese Patent No. 2003-292850 dated Oct. 15, 2003.

* cited by examiner

*Primary Examiner*—Helene Klemanski
(74) *Attorney, Agent, or Firm*—Ladas and Parry LLP

(57) ABSTRACT

An ink composition including: a colorant, a betaine-based surfactant represented by the following formula (1) and a defoaming agent:
[c1]

$$(R)_p\text{-}N\text{-}[L\text{-}(COOM)_q]_r \qquad \text{(Formula 1)}$$

(wherein, R represents a hydrogen atom, alkyl group, aryl group or heterocyclic group, L represents a divalent or more linking group, M represents a hydrogen atom, alkaline metal atom, ammonium group, protonated organic amine or nitrogen-containing heterocyclic group or quaternary ammonium ion group, or represents a group that does not exist as a cation in the case of being a counter ion of an ammonium ion comprising an N atom in formula (1), q represents an integer of 1 or more, r represents an integer of 1 to 4, p represents an integer of 0 to 4, p+r is 3 or 4, N is a nitrogen atom that composes a quaternary amine in the case where p+r is 4, R may be the same or different when p is 2 or more, COOM may be the same or different when q is 2 or more, and $L\text{-}(COOM)_q$ may be the same or different when r is 2 or more).

20 Claims, No Drawings

INK COMPOSITION, INK CARTRIDGE, RECORDING METHOD, AND RECORDED PRODUCT

CROSS-REFERENCES TO RELATED APPLICATIONS

The entire disclosure of Japanese Patent Application No. 2006-133572, filed on May 12, 2006 and Japanese Patent Application No. 2006-309416, filed on Nov. 15, 2006, is expressly incorporated by reference herein.

BACKGROUND

1. Technical Field

The present invention relates to an ink composition and a recording method and recorded article using the same, and more particularly, to an ink composition having little foaming and satisfactory defoaming properties, and therefore having superior reliability (such as clogging recoverability and discharge stability), while enabling attractive color development as well as having superior image durability (such as light resistance and moisture resistance) and being able to maintain printer performance for a long period of time, an ink jet recording method that uses an ink composition having these properties, and a recorded article that maintains a state of attractive color development obtained with that recording method for a long period of time.

2. Related Art

The ink jet recording method is a printing method whereby printing is carried out by projecting droplets of ink and causing them to adhere to a recording medium such as paper. Improvement of printing quality and storage of printed articles has been proposed by using for the ink a colorant in the form of a pigment or dye as a composition used together with a surfactant and resin fine particles.

However, since the use of such a surfactant causes the ink to have high foaming and low defoaming properties due to the properties thereof, ink compositions containing a surfactant had the problem of lacking reliability in terms of discharge stability, clogging recoverability and the like (see JP-A-2004-315739). Therefore, there has been a need for a technology that inhibits foaming and improves defoaming properties for ink compositions containing a surfactant.

On the other hand, studies have also been conducted on a diverse range of surfactants (such as betaine-based surfactants) and resin fine particles in response to a growing demand for higher printing quality and greater stability of printed articles being placed on ink jet printers in recent years (see JP-A-2005-187790).

SUMMARY

With the foregoing in view, an object of the present invention is to provide an ink composition having little foaming and satisfactory defoaming properties, while also having superior printing stability and enabling high printing quality and storage of printed articles, along with an ink composition enabling high image durability and attractive color development, an ink jet recording method that uses an ink composition having such properties, and a recorded article having high image quality obtained with that recording method.

As a result of conducting extensive studies to solve the above-mentioned problems, the inventors of the present invention obtained the finding that an ink composition at least containing a colorant, a specific betaine-based surfactant and a defoaming agent demonstrates the effects of dramatically improving foaming and defoaming properties.

The present invention provides the following inventions based on this finding:

[1] an ink composition comprising: a colorant, a betaine-based surfactant represented by the following formula (1) and a defoaming agent:

[C1]

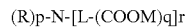

$$(R)_p\text{-}N\text{-}[L\text{-}(COOM)_q]_r \qquad \text{(Formula 1)}$$

(wherein, R represents a hydrogen atom, alkyl group, aryl group or heterocyclic group, L represents a divalent or more linking group, M represents a hydrogen atom, alkaline metal atom, ammonium group, protonated organic amine or nitrogen-containing heterocyclic group or quaternary ammonium ion group, or represents a group that does not exist as a cation in the case of being a counter ion of an ammonium ion comprising an N atom in formula (1), q represents an integer of 1 or more, r represents an integer of 1 to 4, p represents an integer of 0 to 4, p+r is 3 or 4, N is a nitrogen atom that composes a quaternary amine in the case where p+r is 4, R may be the same or different when p is 2 or more, COOM may be the same or different when q is 2 or more, and $L\text{-}(COOM)_q$ may be the same or different when r is 2 or more);

[2] the ink composition described in [1] above, wherein the betaine-based surfactant represented by formula (1) is a compound represented by the following formula (1-1):

[C2]

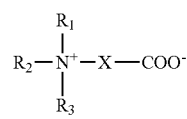

Formula (1-1)

$$R_2 - \overset{R_1}{\underset{R_3}{N^+}} - X - COO^-$$

(wherein, $R_1$ to $R_3$ represent an alkyl group having 1 to 20 carbon atoms, and X represents a divalent linking group);

[3] the ink composition described in [1] above, wherein the betaine-based surfactant represented by formula (1) is a compound represented by the following formula (1-2):

[C3]

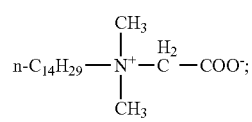

Formula (1-2)

$$n\text{-}C_{14}H_{29} - \overset{CH_3}{\underset{CH_3}{N^+}} - \overset{H_2}{C} - COO^-;$$

[4] the ink composition described in [1] above, wherein the content of the defoaming agent is 0.1 to 1.0% by weight;

[5] the ink composition described in [1] above, wherein the ratio of the content of the defoaming agent to the content of the betaine-based surfactant is a weight ratio of 1:0.1 to 1:1.7;

[6] the ink composition described in [1] above, wherein the defoaming agent is a diacetylene tetraol represented by the following general formula (3):

[C4]

Formula (3)

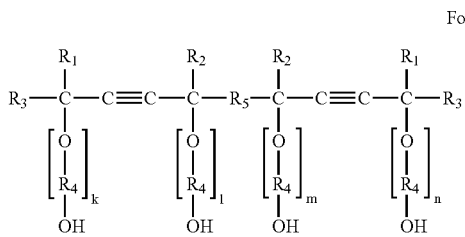

(wherein, $R_1$ and $R_2$ respectively and independently represent an alkyl group having 1 to 8 carbon atoms, $R_3$ respectively and independently represents a hydrogen atom or a methyl group, —O—$R_4$— respectively and independently represents an oxyethyl, oxypropyl or oxybutyl group, $R_5$ represents a divalent linking group, and k, l, m and n respectively represent an integer of 1 to 100);

[7] the ink composition described in [1] above, wherein the defoaming agent is a silicone-based defoaming agent;

[8] the ink composition described in [1] above, wherein the colorant is a magenta dye represented by the following general formula (2) and the defoaming agent is represented by the following general formula (3):

[C5]

Formula (2)

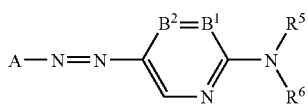

(wherein, A represents a residue of a five-member heterocyclic diazo component A-$NH_2$, $B^1$ and $B^2$ respectively represent —$CR^1$= or —$CR^2$= or one represents a nitrogen atom and the other represents —$CR^1$= or —$CR^3$=, $R^5$ and $R^6$ respectively and independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group, each group may further have a substituent, G, $R^1$ and $R^2$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, amino group substituted with an alkyl group, aryl group or heterocyclic group, acylamino group, ureido group, sulfamoylamino group, alkoxycarbonylamino group, aryl oxycarbonylamino group, alkyl and arylsulfonylamino group, aryloxycarbonylamino group, nitro group, alkyl and arylthio group, alkyl and arylsulfonyl group, alkyl and arylsulfinyl group, sulfamoyl group, sulfo group or heterocyclic thio group, each group may be further substituted, and $R^1$ and $R^5$ or $R^1$ and $R^3$ may be bonded to form a five- to six-member ring);

[C4]

Formula (3)

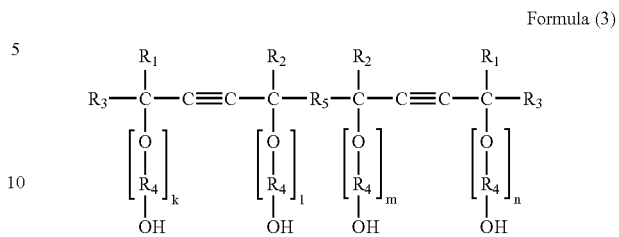

(wherein, $R_1$ and $R_2$ respectively and independently represent an alkyl group having 1 to 8 carbon atoms, $R_3$ respectively and independently represents a hydrogen atom or a methyl group, —O—$R_4$— respectively and independently represents an oxyethyl, oxypropyl or oxybutyl group, $R_5$ represents a divalent linking group, and k, l, m and n respectively represent an integer of 1 to 100);

[9] the ink composition described in [8] above, wherein the content of the defoaming agent is 0.1 to 1.0% by weight;

[10] the ink composition described in [8] above, wherein the ratio of the content of the defoaming agent to the content of the betaine-based surfactant is a weight ratio of 1:0.1 to 1:1.7;

[11] the ink composition described in [8] above, wherein the magenta dye represented by the general formula (2) is a magenta dye represented by the following general formula (4):

[C6]

Formula (4)

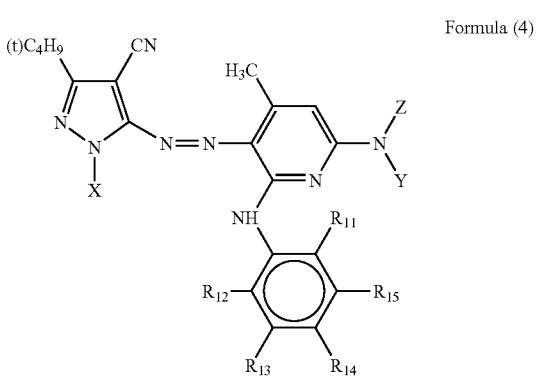

(wherein, $R_{11}$ and $R_{12}$ respectively and independently an alkyl group, alkoxy group or halogen atom, and when $R_{11}$ and $R_{12}$ are both alkyl groups, the total number of carbon atoms that compose the alkyl groups is 3 or more and these groups may be further substituted, $R_{13}$, $R_{14}$ and $R_{15}$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group, each group may be further substituted, $R_{11}$ and $R_{15}$ or $R_{12}$ and $R_{13}$ may be mutually condensed into a ring, X represents a hydrogen atom, aliphatic group, aromatic group or heterocyclic group, Y and Z respectively and independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group, and each group may further have a substituent);

[12] the ink composition described in [8] above, wherein the magenta dye represented by the general formula (2) is a magenta dye represented by the following general formula (5):

[C7]

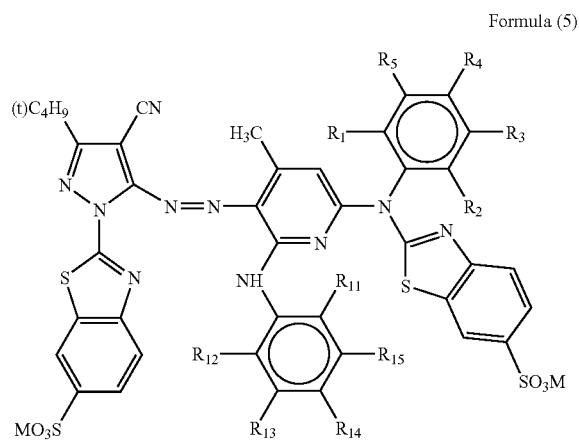

Formula (5)

(wherein, $R_1$ and $R_2$ respectively and independently represent an alkyl group, alkoxy group or halogen atom, and when both $R_1$ and $R_2$ are alkyl groups, the total number of carbon atoms that compose the alkyl groups is 3 or more and these groups may be further substituted, $R_3$, $R_4$ and $R_5$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group, each group may be further substituted, $R_1$ and $R_5$ or $R_2$ and $R_3$ may be mutually condensed into a ring, $R_{11}$ and $R_{12}$ respectively and independently represent an alkyl group, alkoxy group or halogen atom, and when $R_{11}$ and $R_{12}$ are both alkyl groups, the total number of carbon atoms that compose the alkyl groups is 3 or more and these may be further substituted, $R_{13}$, $R_{14}$ and $R_{15}$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group, each group may be further substituted, $R_{11}$ and $R_{15}$ or $R_{12}$ and $R_{13}$ may be mutually condensed into a ring, and M represents hydrogen, lithium, sodium, potassium, ammonium or an organic amine);

[13] the ink composition described in [8] above, wherein the magenta dye represented by the general formula (2) is a magenta dye represented by the following formula (6):

[C8]

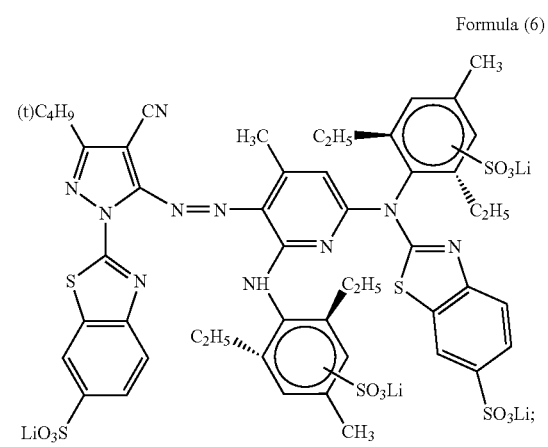

Formula (6)

[14] the ink composition described in [8] above, wherein the content of the magenta dye is 0.50 to 5.00% by weight based on the total weight of the ink composition;

[15] the ink composition described in [8] above, wherein the betaine-based surfactant represented by the general formula (1) is a compound represented by the following general formula (1-1):

[C2]

Formula (1-1)

(wherein, $R_1$ to $R_3$ represent an alkyl group having 1 to 20 carbon atoms, and X represents a divalent linking group);

[16] the ink composition described in [8] above, wherein the betaine-based surfactant represented by the general formula (1) is a compound represented by the following formula (1-2):

[C3]

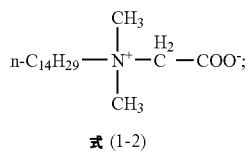

Formula (1-2)

[17] the ink composition described in [8] above, wherein the ratio of the content of the betaine-based surfactant to the content of the magenta dye is a weight ratio of 1:10 to 1:0.13;
[18] the ink composition described in any of [1] to [17] above, wherein the ink composition is used in an ink jet recording method in which liquid droplets of the ink composition are discharged and the liquid droplets are adhered to a recording medium,
[19] the ink composition described in [18] above, wherein the ink jet recording method is a recording method that uses an ink jet head that forms ink droplets by mechanical deformation of a piezoelectric device;
[20] an ink cartridge filled with the ink composition as described in any of [1] to [17] above;
[21] an ink jet recording method comprising using the ink composition as described in any of [1] to [17] above for an ink composition, and using the ink jet cartridge as described in [20] above; and,
[22] a recorded article, which is recorded by the ink jet recording method described in [21] above.

The ink composition of the present invention is preferable as an ink for existing ink jet printers. In addition, since the ink composition has adequate foaming inhibitory effects and improves defoaming properties, it is able to provide superior reliability and high printed article quality and printed article storageability in a typical ink jet recording method.

In addition, since the ink composition of the present invention also has superior image durability (such as light resistance and moisture resistance), low foaming, superior defoaming properties and satisfactory printing stability, it can be preferably used as an ink for an ink jet printer. Consequently, the ink composition of the present invention is able to provide recorded articles of high image quality in a typical ink jet recording method.

DESCRIPTION OF EXEMPLARY EMBODIMENTS

The following provides an explanation of exemplary embodiments of the present invention.

[Betaine-Based Surfactant]

The betaine-based surfactant used in the ink composition of the present embodiment is a betaine-based surfactant represented by the following formula (1).

[C1]

(R)p-N-[L-(COOM)q]r    Formula (1)

In the above formula, R represents a hydrogen atom, alkyl group, aryl group or heterocyclic group. L represents a divalent or more linking group. M represents a hydrogen atom, alkaline metal atom, ammonium group, protonated organic amine or nitrogen-containing heterocyclic group or quaternary ammonium ion group, or represents a group that does not exist as a cation in the case of being a counter ion of an ammonium ion comprising an N atom in formula (1). q rep-resents an integer of 1 or more, and r represents an integer of 1 to 4. p represents an integer of 0 to 4, and p+r is 3 or 4. N is a nitrogen atom that composes a quaternary amine in the case where p+r is 4. R may be the same or different when p is 2 or more. COOM may be the same or different when q is 2 or more. L-(COOM)$_q$ may be the same or different when r is 2 or more.

The betaine-based surfactant used in the ink composition of the present embodiment is preferably a betaine-based surfactant represented by the following formula (1-1) in terms of improving fixation of the ink composition to a printed article, light resistance and ozone resistance. One type of compound represented by the following formula (1-1) may be used alone or a plurality of types may be used as a mixture thereof.

[C2]

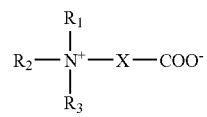

Formula (1-1)

In the above formula, $R_1$ to $R_3$ represent an alkyl group having 1 to 20 carbon atoms, and X represents a divalent linking group.

The betaine-based surfactant used in the ink composition of the present embodiment is preferably a betaine-based surfactant represented by the following formula (1-2) in terms of improving fixation of the ink composition to a printed article.

[C3]

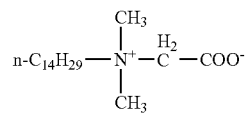

Formula (1-2)

The content of the betaine-based surfactant used in the ink composition of the present embodiment is preferably 0.6 to 1.0% by weight based on the total weight of the ink composition.

[Defoaming Agent]

Examples of defoaming agents able to be used in the present invention include silicone-based defoaming agents, diacetylene tetraol- and acetylenediol-based defoaming agents, foam-controlling polymer-based defoaming agents and fatty acid ester-based defoaming agents. One type of these defoaming agents may be used alone or two or more types may be used in combination.

Examples of the above-mentioned silicone-based defoaming agents include KS508, KS531, KM72 or KM85 manufactured by Shin-Etsu Chemical Co., Ltd., Q-23183A or SH5510 manufactured by Dow Corning Toray Co., Ltd., SAG30 manufactured by Nippon Unicar Co., Ltd., members of the Adecanate series manufactured by Asahi Denka Kogyo Co., Ltd., and BYK-019, BYK-020, BYK-025, BYK-080A, BYK-094, BYK-1650 or BYK-1660 manufactured by BYK Japan Co., Ltd. BYK-1650 and BYK-1660 manufactured by BYK Japan Co., Ltd. are particularly preferable.

Examples of the above-mentioned diacetylene tetraol-based defoaming agents include Saffinol MD20 manufactured by Air Products Japan Inc.

Examples of the above-mentioned acetylenediol-based defoaming agents include Olfine SPC manufactured by Nissin Chemical Industry Co., Ltd.

Examples of the above-mentioned foam-controlling polymer-based defoaming agents include BYK-012 manufactured by BYK Japan Co., Ltd. and StarFactant 20 manufactured by Cognis Japan Ltd.

Among these defoaming agents, diacetylene tetraol-based defoaming agents and silicone-based defoaming agents are preferable from the viewpoint of foaming inhibitory effects and defoaming properties. One type of these defoaming agents may be used alone or two or more types may be used in combination.

Moreover, a diacetylene tetraol-based defoaming agent is most preferable based on the projection stability of ink droplets in the case of using in an ink composition for an ink jet printer. Furthermore, the projection stability of ink droplets is evaluated by the range of speed at which ink droplets can be stably projected either at the start of or during the course of ink droplet projection.

The general formula of the above-mentioned diacetylene tetraol-based defoaming agent is indicated with the following formula (3). Examples of diacetylene tetraol-based defoaming agents represented by the following general formula (3) include Saffinol MD20 manufactured by Air Products Japan Inc.

[C4]

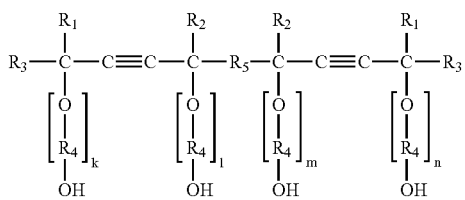

Formula (3)

In the above formula, $R_1$ and $R_2$ respectively and independently represent an alkyl group having 1 to 8 carbon atoms, $R_3$ respectively and independently represents a hydrogen atom or a methyl group, —O—$R_4$— respectively and independently represents an oxyethyl, oxypropyl or oxybutyl group, $R_5$ represents a divalent linking group, and k, l, m and n respectively represent an integer of 1 to 100.

If the incorporated amount of defoaming agent is excessively low, adequate foaming inhibitory effects and improvement of defoaming properties are not obtained in the ink composition, while if the incorporated amount is excessively high, printing stability (such as projection stability of ink droplets) is impaired. Consequently, in the present embodiment, an defoaming agent is preferably contained in the ink composition within the range of 0.1 to 1.0% by weight.

By incorporating the betaine-based surfactant and defoaming agent at a weight ratio of 1:0.1 to 1:1.7, an ink composition can be obtained having satisfactory balance in terms of allowing the obtaining of adequate foaming inhibitory effects and improvement of defoaming properties and superior printing stability for the entire ink composition.

If the static surface tension of the ink composition in the present embodiment is excessively low, a stable discharge volume and projection form may not be obtained, while if the static surface tension is excessively high, generated bubbles may be difficult to dissipate. Thus, the static surface tension is preferably within the range of 20 to 40 mN/m, and preferably within the range of 26 to 34 mN/m. Furthermore, static surface tension in the present invention refers to the value measured using a commercially available Wilhelmi surface tensiometer according to a method complying with JIS K 3362.

Moreover, since discharge stability decreases if the viscosity of the ink composition in the present embodiment at 20° C. is excessively low or excessively high, it is preferably within the range of 2 to 10 mPa·s, and more preferably within the range of 3.5 to 4.5 mPa·s. Furthermore, this viscosity can be measured with a commercially available viscometer and the like.

[Colorant]

A water-soluble dye or pigment can be used for the colorant in the present invention provided it can be used in an ordinary ink jet recording method.

There are no particular limitations on the type of dye, and acidic dyes, direct dyes, reactive dyes or basic dyes can be used, examples of which include C.I. Acid Yellow 17, 23, 42, 44, 79 or 142, C.I. Acid Red 52, 80, 82, 249, 254 or 289, C.I. Acid Blue 9, 45 or 249, C.I. Acid Black 1, 2, 24 or 94, C.I. Food Black 1 or 2, C.I. Direct Yellow 1, 12, 24, 33, 50, 55, 58, 86, 132, 142, 144 or 173, C.I. Direct Red 1, 4, 9, 80, 81, 225 or 227, C.I. Direct Blue 1, 2, 15, 71, 86, 87, 98, 165, 199 or 202, C.I. Direct Black 19, 38, 51, 71, 154, 168, 171 of 195, C.I. Reactive Red 14, 32, 55, 79 or 249, and C.I. Reactive Black 3, 4 or 35.

There are no particular limitations on the above-mentioned pigment, and organic pigments or inorganic pigments such as carbon black may be used.

Examples of the organic pigments include quinacridone pigment, quinacridonequinone pigment, dioxazine pigment, phthalocyanine pigment, anthrapyrimidine pigment, ansanthrone pigment, indanthrone pigment, flavanthrone pigment, perylene pigment, diketopyrrolopyrrole pigment, perynone pigment, quinophthalone pigment, anthraquinone pigment, thioindigo pigment, benzimidazolone pigment, isoindolinone pigment, azomethin pigment and azo pigment.

A magenta dye represented by the following general formula (2) can also be used for the above-mentioned colorant.

[C5]

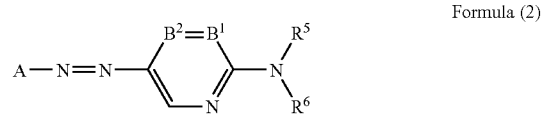

Formula (2)

In the above formula, A represents a residue of a five-member heterocyclic diazo component A-NH$_2$. $B^1$ and $B^2$ respectively represent —$CR^1$= or —$CR^2$= or one represents a nitrogen atom and the other represents —$CR^1$= or —$CR^3$=.

$R^5$ and $R^6$ respectively and independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. Each group may further have a substituent.

G, $R^1$ and $R^2$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, amino group substituted with an alkyl group, aryl group or heterocyclic group, acylamino group, ureido group, sulfamoylamino group, alkoxycarbonylamino group, aryl oxycarbonylamino group, alkyl and arylsulfonylamino group, aryloxycarbonylamino group, nitro group, alkyl and arylthio group, alkyl and arylsulfonyl group, alkyl and arylsulfinyl group, sulfamoyl group, sulfo group or heterocyclic thio group. Each group may be further substituted.

In addition, $R^1$ and $R^5$ or $R^1$ and $R^3$ may be bonded to form a five- to six-member ring.

The magenta dye represented by the general formula (2) is preferably a magenta dye represented by the following general formula (4) from the viewpoint of light resistance and ozone resistance.

[C6]

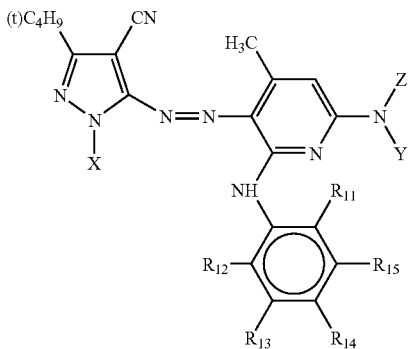

Formula (4)

In the above formula, $R_{11}$ and $R_{12}$ respectively and independently an alkyl group, alkoxy group or halogen atom, and when $R_{11}$ and $R_{12}$ are both alkyl groups, the total number of carbon atoms that compose the alkyl groups is 3 or more and these groups may be further substituted. $R_{13}$, $R_{14}$ and $R_{15}$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group. Each group may be further substituted. In addition, $R_{11}$ and $R_{15}$ or $R_{12}$ and $R_{13}$ may be mutually condensed into a ring.

X represents a hydrogen atom, aliphatic group, aromatic group or heterocyclic group, and Y and Z respectively and independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. Each group may further have a substituent.

In addition, the magenta dye represented by the general formula (2) is more preferably a magenta dye represented by the following general formula (5) from the viewpoint of light resistance and ozone resistance.

[C7]

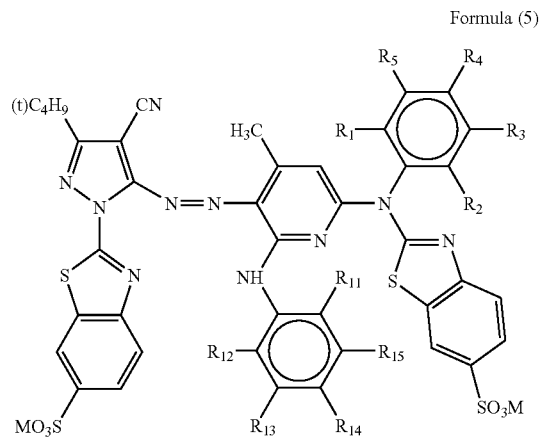

Formula (5)

In the above formula, $R_1$ and $R_2$ respectively and independently represent an alkyl group, alkoxy group or halogen atom, and when both $R_1$ and $R_2$ are alkyl groups, the total number of carbon atoms that compose the alkyl groups is 3 or more and these groups may be further substituted. $R_3$, $R_4$ and $R_5$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group. Each group may be further substituted. In addition, $R_1$ and $R_5$ or $R_2$ and $R_3$ may be mutually condensed into a ring.

$R_{11}$ and $R_{12}$ respectively and independently represent an alkyl group, alkoxy group or halogen atom, and when $R_{11}$ and $R_{12}$ are both alkyl groups, the total number of carbon atoms that compose the alkyl groups is 3 or more and these may be further substituted. $R_{13}$, $R_{14}$ and $R_{15}$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group. Each group may be further substituted. $R_{11}$ and $R_{15}$ or $R_{12}$ and $R_{13}$ may be mutually condensed into a ring. M represents hydrogen, lithium, sodium, potassium, ammonium or an organic amine.

In addition, the magenta dye represented by the general formula (2) is more preferably a magenta dye represented by the following formula (6) from the viewpoint of light resistance, ozone resistance and solubility in water.

[C8]

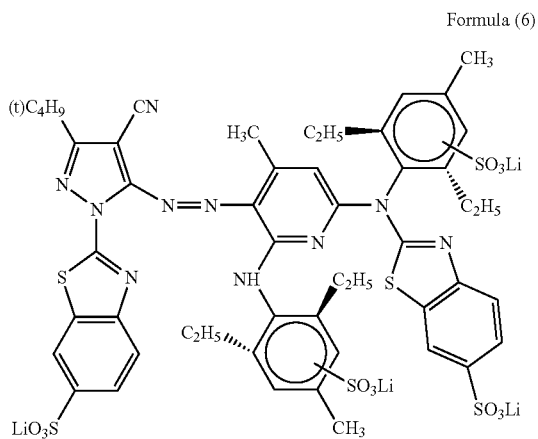

Formula (6)

The content of the magenta dye is preferably 0.50 to 5.00% by weight based on the total weight of the ink composition from the viewpoint of obtaining adequate color density and maintaining clogging reliability.

In addition, by incorporating the betaine-based surfactant and the magenta dye at a weight ratio of 1:1.2 to 1:0.2, an ink composition can be obtained having satisfactory balance in terms of having superior image durability (such as light resistance and moisture resistance) and adequate clogging recoverability.

[Other Ink Components]

Moreover, in the present embodiment, a nonionic surfactant, anionic surfactant and cationic surfactant may be contained in addition to the betaine-based surfactant described above, and a nonionic surfactant is particularly preferably contained from the viewpoint of obtaining an ink composition having suitable static surface tension.

More specific examples of nonionic surfactants include acetylene glycol-based surfactants, acetylene alcohol-based surfactants, ether-based surfactants such as polyoxyethylene nonyl phenyl ether, polyoxyethylene octyl phenyl ether, polyoxyethylene decyl phenyl ether, polyoxyethylene alkyl allyl ether, polyoxyethylene oleyl ether, polyoxyethylene lauryl ether, polyoxyethylene alkyl ether or polyoxyalkylene lauryl ether, polyoxyethylene oleic acid, ester-based surfactants such as polyoxyethylene oleic acid ester, polyoxyethylene distearate, sorbitan laurate, sorbitan monostearate, sorbitan monooleate, sorbitan sesquioleate, polyoxyethylene monooleate or polyoxyethylene stearate, silicon-based surfactants such as dimethylpolysiloxane, and fluorine-containing surfactants such as fluoroalkylesters and perfluoroalkyl carboxylates.

Furthermore, these nonionic surfactants are preferably contained at 0.1 to 5% by weight in the ink composition from the viewpoint of obtaining an ink composition having suitable static surface tension.

In addition, among the above-mentioned nonionic surfactants, acetylene alcohol-based surfactants are particularly preferable since they exhibit little foaming and have superior defoaming performance.

Although more specific examples of acetylene alcohol-based surfactants include 2,4,7,9-tetramethyl-5-decene-4,7-diol, 3,6-dimethyl-4-octene-3,6-diol and 3,5-dimethyl-1-hexene-3-ol, these surfactants can be also be acquired in the form of commercially available products, examples of which include Saffinol 104, 82, 465, 485 or TG manufactured by Air Products Japan Inc. and Olfine STG or Olfine E1010 manufactured by Nissin Chemical Industry Co., Ltd.

Moreover, the ink composition of the present embodiment may also contain a permeation promoter. There are no particular limitations on the permeation promoter used in the ink composition of the present embodiment, and glycol ethers are particularly preferable.

Specific examples of glycol ethers include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol isopropyl ether, diethylene glycol monoisopropyl ether, ethylene glycol mono-n-butyl ether, ethylene glycol mono-tert-butyl ether, diethylene glycol mono-tert-butyl ether, 1-methyl-1-methoxybutanol, propylene glycol monomethyl ether, propylene glycol monoethyl ether, propylene glycol mono-tert-butyl ether, propylene glycol mono-n-propyl ether, propylene glycol monoisobutyl ether, dipropylene glycol monomethyl ether, dipropylene glycol monoethyl ether, dipropylene glycol mono-n-propyl ether and dipropylene glycol monoisopropyl ether, and one type of these glycol ethers may be used or two or more types may be used as a mixture.

Furthermore, these permeation promoters are preferably added in amount within the range of 0.25 to 10% by weight to the ink composition from the viewpoint of securing proper physical property values (such as viscosity) of the ink composition and securing printing quality and reliability.

A pH adjuster, antioxidant, ultraviolet absorber, antiseptic/antimold agent and the like can be added to the ink composition of the present embodiment as described above as necessary.

Examples of pH adjusters that can be used include alkaline metal hydroxides such as lithium hydroxide, potassium hydroxide or sodium hydroxide, and amines such as ammonia, triethanolamine, tripropanolamine, diethanolamine or monoethanolamine. In addition, collidine, imidazole, phosphoric acid, 3-(N-morpholino)propane sulfonate, tris(hydroxymethyl)aminomethane or boric acid and the like can be used as a pH buffer as necessary.

Examples of antioxidants and ultraviolet absorbers used include alohanates such as alohanate or methyl alohanate, biurets such as biuret, dimethyl biuret or tetramethyl biuret and L-ascorbic acid and salts thereof, as well as Tinuvin 328, 900, 1130, 384, 292, 123, 144, 622, 770 or 292, Irgacor 252 or 153, or Irganox 1010, 1076, 1035 or MD1024 all manufactured by Ciba Geigy Co., Ltd., and lanthamide oxides.

Examples of antiseptics and antimold agents include sodium benzoate, sodium pentachlorophenol, sodium 2-pyridinethiol-1-oxide, sodium sorbate, sodium dehydroacetate and 1,2-dibenzisothiazolin-3-one (Proxel CRL, Proxel BDN, Proxel GXL, Proxel XL-2 or Proxel TN available from Avecia Biologics Ltd.).

In addition, the main solvent contained in the ink composition of the present embodiment is water. Pure water or ultra-pure water and the like such as ion exchange water, ultrafiltration water, reverse osmosis water or distilled water can be used for this water. The use of water that has been sterilized by ultraviolet irradiation or addition of hydrogen peroxide and the like is particularly preferable in terms of allowing the ink composition to be stored for a long period of time by preventing growth of mold and bacteria.

[Ink Jet Recording Method]

Although the ink composition of the present embodiment can be preferably used in a writing instrument such as a pen or in a stamp and the like, it can be used more preferably in an ink jet recording method in which droplets of the ink composition are discharged and the droplets are adhered to a recording medium. Here, an "ink jet recording method" refers to a method in which an ink composition is discharged from a fine nozzle in the form of liquid droplets and the droplets are adhered to a recording medium, specific examples of which are described below.

A first example of an ink jet recording method is an electrostatic attraction method. In this method, a strong electric field is applied between a nozzle and acceleration electrodes placed in front of the nozzle, ink in the form of droplets is sprayed continuously from the nozzle, and a printing information signal is applied to deflection electrodes and recorded during the time the ink droplets are projected between the deflection electrodes, or the ink droplets may be sprayed corresponding to the printing information signal without being deflected.

A second example involves applying pressure to the ink droplets with a small pump and forcibly spraying the ink droplets by mechanically oscillating the nozzle with a crystal unit and the like. In this method, the sprayed ink droplets are charged simultaneous to being sprayed, and a printing information signal is applied to deflection electrodes and recorded during the time the ink droplets are projected between the deflection electrodes.

A third example is a method that uses a piezoelectric device (piezo device). In this method, recording is carried out by applying pressure to the ink droplets with a piezoelectric device simultaneous to the application of a printing information signal followed by spraying the ink droplets.

A fourth example is a method in which ink droplets are made to rapidly swell in volume due to the action of thermal energy. In this method, recording is carried out by heating and foaming the ink droplets with microelectrodes according to a printing information signal followed by spraying the ink droplets.

Any of these methods can be used for the ink jet recording method that uses the ink of the present embodiment, and the ink can be filled into each type of ink jet cartridge.

In addition, examples of a "recording medium" as referred to in the present embodiment include, but are not particularly limited to paper (such as Xerox P (trade name: Fuji Xerox Co., Ltd.), Xerox 4024 (trade name: Xerox Co. (USA)) or Crispia Photographic Paper <High Gloss> (trade name: Seiko Epson Corp.)).

[Recorded Article]

A recorded article of the present embodiment is that on which recording has been carried out by the ink jet recording method described above using the previously described ink composition. Since this recorded article is obtained by the above-mentioned ink jet recording method using the previously described ink composition, it has satisfactory printing quality, demonstrates superior printing stability, demonstrates attractive color development and is able to maintain the attractive color development over a long period of time.

EXAMPLE A

Examples 1 TO 46

The ink compositions of Examples 1 to 46 were prepared by mixing and dissolving each component at the formulation ratios shown in Tables 1 and 2 followed by subjecting to pressure filtration with a PTFE (polytetrafluoroethylene) filter having a pore diameter of 1 μm.

Furthermore, each component of the ink compositions shown in Tables 1 and 2 is indicated as the percent by weight of each component based on the total weight of the ink composition, and the balance of each composition is comprised of water.

TABLE 1

| Material | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Compound 1 [1a] | 2.00 | 2.00 | 2.00 | 2.00 | 2.00 | 2.00 | | | | | | |
| Compound 2 [1b] | | | | | | | 2.00 | 2.00 | 2.00 | 2.00 | 2.00 | 2.00 |
| Betaine-based surfactant [2] | 1.00 | 1.00 | 1.00 | 1.00 | 1.00 | 1.00 | 1.00 | 1.00 | 1.00 | 1.00 | 1.00 | 1.00 |
| TEGmBE [3] | 9.00 | 9.00 | 9.00 | 9.00 | 9.00 | 9.00 | 9.00 | 9.00 | 9.00 | 9.00 | 9.00 | 9.00 |
| Glycerin | 9.00 | 9.00 | 9.00 | 9.00 | 9.00 | 9.00 | 9.00 | 9.00 | 9.00 | 9.00 | 9.00 | 9.00 |
| 2-pyrrolidone | 3.20 | 3.20 | 3.20 | 3.20 | 3.20 | 3.20 | 3.20 | 3.20 | 3.20 | 3.20 | 3.20 | 3.20 |
| Olfine E1010 [4] | 0.70 | 0.70 | 0.70 | 0.70 | 0.70 | 0.70 | 0.70 | 0.70 | 0.70 | 0.70 | 0.70 | 0.70 |
| Olfine PD002W [4] | 0.10 | 0.10 | 0.10 | 0.10 | 0.10 | 0.10 | 0.10 | 0.10 | 0.10 | 0.10 | 0.10 | 0.10 |
| Triethanol amine | 0.40 | 0.40 | 0.40 | 0.40 | 0.40 | 0.40 | 0.40 | 0.40 | 0.40 | 0.40 | 0.40 | 0.40 |
| Urea | 5.00 | 5.00 | 5.00 | 5.00 | 5.00 | 5.00 | 5.00 | 5.00 | 5.00 | 5.00 | 5.00 | 5.00 |
| Benzotriazole | 0.01 | 0.01 | 0.01 | 0.01 | 0.01 | 0.01 | 0.01 | 0.01 | 0.01 | 0.01 | 0.01 | 0.01 |
| Proxel XL-2 [5] | 0.30 | 0.30 | 0.30 | 0.30 | 0.30 | 0.30 | 0.30 | 0.30 | 0.30 | 0.30 | 0.30 | 0.30 |
| EDTA [6] | 0.02 | 0.02 | 0.02 | 0.02 | 0.02 | 0.02 | 0.02 | 0.02 | 0.02 | 0.02 | 0.02 | 0.02 |
| BYK-012 [7] | | | | | | | | | | | | |
| BYK-019 [7] | | | | | | | | | | | | |
| BYK-020 [7] | 1.00 | | | | | | | 0.10 | 1.00 | | | |
| BYK-025 [7] | | | | | | | | | | | | |
| BYK-080 A [7] | | 1.00 | | | | | | | | 0.10 | 1.00 | |
| BYK-094 [7] | | | | | | | | | | | | |

TABLE 1-continued

| Material | | | | | | | | | | | |
|---|---|---|---|---|---|---|---|---|---|---|---|
| BYK-1650 [7] | | 1.00 | | | | | | | | 0.10 | 1.00 |
| BYK-1660 [7] | | | 1.00 | | | | | | | | |
| Olfine SPC [8] | | | | | | | | | | | |
| Saffinol MD20 [9] | | | | 1.00 | | | | | | | |
| StarFactant 20 [10] | | | | | 1.00 | | | | | | |
| Water | 68.27 | 68.27 | 68.27 | 68.27 | 68.27 | 68.27 | 69.17 | 68.27 | 69.17 | 68.27 | 68.27 |
| Total | 100.00 | 100.00 | 100.00 | 100.00 | 100.00 | 100.00 | 100.00 | 100.00 | 100.00 | 100.00 | 100.00 |

| | | Examples | | | | | | | | | | |
|---|---|---|---|---|---|---|---|---|---|---|---|---|
| Material | | 13 | 14 | 15 | 16 | 17 | 18 | 19 | 20 | 21 | 22 | 23 |
| Compound 1 [1a] | | | | | | | | 0.60 | 0.60 | 0.60 | 0.60 | 0.60 |
| Compound 2 [1b] | | 2.00 | 2.00 | 2.00 | 2.00 | 2.00 | 2.00 | | | | | |
| Betaine-based surfactant [2] | | 1.00 | 1.00 | 1.00 | 1.00 | 1.00 | 1.00 | 0.60 | 0.60 | 0.60 | 0.60 | 0.60 |
| TEGmBE [3] | | 9.00 | 9.00 | 9.00 | 9.00 | 9.00 | 9.00 | 9.00 | 9.00 | 9.00 | 9.00 | 9.00 |
| Glycerin | | 9.00 | 9.00 | 9.00 | 9.00 | 9.00 | 9.00 | 13.00 | 13.00 | 13.00 | 13.00 | 13.00 |
| 2-pyrrolidone | | 3.20 | 3.20 | 3.20 | 3.20 | 3.20 | 3.20 | 3.50 | 3.50 | 3.50 | 3.50 | 3.50 |
| Olfine E1010 [4] | | 0.70 | 0.70 | 0.70 | 0.70 | 0.70 | 0.70 | 0.40 | 0.40 | 0.40 | 0.40 | 0.40 |
| Olfine PD002W [4] | | 0.10 | 0.10 | 0.10 | 0.10 | 0.10 | 0.10 | 0.40 | 0.40 | 0.40 | 0.40 | 0.40 |
| Triethanol amine | | 0.40 | 0.40 | 0.40 | 0.40 | 0.40 | 0.40 | | | | | |
| Urea | | 5.00 | 5.00 | 5.00 | 5.00 | 5.00 | 5.00 | 4.00 | 4.00 | 4.00 | 4.00 | 4.00 |
| Benzotriazole | | 0.01 | 0.01 | 0.01 | 0.01 | 0.01 | 0.01 | 0.01 | 0.01 | 0.01 | 0.01 | 0.01 |
| Proxel XL-2 [5] | | 0.30 | 0.30 | 0.30 | 0.30 | 0.30 | 0.30 | 0.30 | 0.30 | 0.30 | 0.30 | 0.30 |
| EDTA [6] | | 0.02 | 0.02 | 0.02 | 0.02 | 0.02 | 0.02 | 0.02 | 0.02 | 0.02 | 0.02 | 0.02 |
| BYK-012 [7] | | | | | | | | | | | | |
| BYK-019 [7] | | | | | | | | | | | | |
| BYK-020 [7] | | | | | | | | 1.00 | | | | |
| BYK-025 [7] | | | | | | | | | | | | |
| BYK-080 A [7] | | | | | | | | | 1.00 | | | |
| BYK-094 [7] | | | | | | | | | | | | |
| BYK-1650 [7] | | | | | | | | | | | 1.00 | |
| BYK-1660 [7] | | 0.10 | 1.00 | | | | | | | | | |
| Olfine SPC [8] | | | | | | | | | | | | |
| Saffinol MD20 [9] | | | | 0.10 | 1.00 | | | | | | | 1.00 |
| StarFactant 20 [10] | | | | | | 0.10 | 1.00 | | | | | |
| Water | | 69.17 | 68.27 | 69.17 | 68.27 | 69.17 | 68.27 | 68.27 | 68.27 | 68.27 | 68.27 | 68.27 |
| Total | | 100.00 | 100.00 | 100.00 | 100.00 | 100.00 | 100.00 | 101.10 | 101.10 | 101.10 | 101.10 | 101.0 |

[1a] C.I. Acid Red 52
[1b] C.I. Direct Yellow 132
[2] Betaine-based surfactant represented by formula (3)
[3] Triethylene glycol monobutyl ether
[4] Acetylene glycol-based surfactant manufactured by Nissin Chemical Industry Co., Ltd.
[5] Antiseptic/antimold agent manufactured by Arch Chemicals, Inc.
[6] Disodium dihydrogen ethylenediamine tetraacetate dihydrate
[7] BYK Japan Ltd. (BYK-012 is a foam-controlling polymer-based defoaming agent, while the others are silicone-based defoaming agents)
[8] Acetylenediol-based defoaming agent manufactured by Nissin Chemical Industry Co., Ltd.
[9] Diacetylene tetraol manufactured by Air Products Japan Inc.
[10] Foam-controlling polymer-based defoaming agent manufactured by Cognis Japan Ltd.

TABLE 2

| Material | Examples | | | | | | | | | | | |
|---|---|---|---|---|---|---|---|---|---|---|---|---|
| | 24 | 25 | 26 | 27 | 28 | 29 | 30 | 31 | 32 | 33 | 34 | 35 |
| Compound 1 [1a] | 0.60 | | | | | | | | | | | |
| Compound 2 [1b] | | 0.60 | 0.60 | 0.60 | 0.60 | 0.60 | 0.60 | 0.60 | 0.60 | 0.60 | 0.60 | 0.60 |
| Betaine-based surfactant [2] | 0.60 | 0.60 | 0.60 | 0.60 | 0.60 | 0.60 | 0.60 | 0.60 | 0.60 | 0.60 | 0.60 | 0.60 |
| TEGmBE [3] | 9.00 | 9.00 | 9.00 | 9.00 | 9.00 | 9.00 | 9.00 | 9.00 | 9.00 | 9.00 | 9.00 | 9.00 |
| Glycerin | 13.00 | 13.00 | 13.00 | 13.00 | 13.00 | 13.00 | 13.00 | 13.00 | 13.00 | 13.00 | 13.00 | 13.00 |
| 2-pyrrolidone | 3.50 | 3.50 | 3.50 | 3.50 | 3.50 | 3.50 | 3.50 | 3.50 | 3.50 | 3.50 | 3.50 | 3.50 |
| Olfine E1010 [4] | 0.40 | 0.40 | 0.40 | 0.40 | 0.40 | 0.40 | 0.40 | 0.40 | 0.40 | 0.40 | 0.40 | 0.40 |
| Olfine PD002W [4] | 0.40 | 0.40 | 0.40 | 0.40 | 0.40 | 0.40 | 0.40 | 0.40 | 0.40 | 0.40 | 0.40 | 0.40 |
| Triethanol amine | | | | | | | | | | | | |
| Urea | 4.00 | 4.00 | 4.00 | 4.00 | 4.00 | 4.00 | 4.00 | 4.00 | 4.00 | 4.00 | 4.00 | 4.00 |
| Benzotriazole | 0.01 | 0.01 | 0.01 | 0.01 | 0.01 | 0.01 | 0.01 | 0.01 | 0.01 | 0.01 | 0.01 | 0.01 |
| Proxel XL-2 [5] | 0.30 | 0.30 | 0.30 | 0.30 | 0.30 | 0.30 | 0.30 | 0.30 | 0.30 | 0.30 | 0.30 | 0.30 |
| EDTA [6] | 0.02 | 0.02 | 0.02 | 0.02 | 0.02 | 0.02 | 0.02 | 0.02 | 0.02 | 0.02 | 0.02 | 0.02 |
| BYK-012 [7] | | | | | | | | | | | | |
| BYK-019 [7] | | | | | | | | | | | | |
| BYK-020 [7] | | 0.10 | 1.00 | | | | | | | | | |
| BYK-025 [7] | | | | | | | | | | | | |
| BYK-080 A [7] | | | | 0.10 | 1.00 | | | | | | | |
| BYK-094 [7] | | | | | | | | | | | | |
| BYK-1650 [7] | | | | | | 0.10 | 1.00 | | | | | |
| BYK-1660 [7] | | | | | | | | 0.10 | 1.00 | | | |
| Olfine SPC [8] | | | | | | | | | | | | |
| Saffinol MD20 [9] | | | | | | | | | | 0.10 | 1.00 | |
| StarFactant 20 [10] | 1.00 | | | | | | | | | | | 0.10 |
| Water | 67.17 | 68.07 | 67.17 | 68.07 | 67.17 | 68.07 | 67.17 | 68.07 | 67.17 | 68.07 | 67.17 | 68.07 |
| Total | 100.00 | 100.00 | 100.00 | 100.00 | 100.00 | 100.00 | 100.00 | 100.00 | 100.00 | 100.00 | 100.00 | 100.00 |

| Material | Examples | | | | | | | | | | |
|---|---|---|---|---|---|---|---|---|---|---|---|
| | 36 | 37 | 38 | 39 | 40 | 41 | 42 | 43 | 44 | 45 | 46 |
| Compound 1 [1a] | | 2.00 | 2.00 | 2.00 | 2.00 | 2.00 | 0.60 | 0.60 | 0.60 | 0.60 | 0.60 |
| Compound 2 [1b] | 0.60 | | | | | | | | | | |
| Betaine-based surfactant [2] | 0.60 | 1.00 | 1.00 | 1.00 | 1.00 | 1.00 | 0.60 | 0.60 | 0.60 | 0.60 | 0.60 |
| TEGmBE [3] | 9.00 | 9.00 | 9.00 | 9.00 | 9.00 | 9.00 | 9.00 | 9.00 | 9.00 | 9.00 | 9.00 |
| Glycerin | 13.00 | 9.00 | 9.00 | 9.00 | 9.00 | 9.00 | 13.00 | 13.00 | 13.00 | 13.00 | 13.00 |
| 2-pyrrolidone | 3.50 | 3.20 | 3.20 | 3.20 | 3.20 | 3.20 | 3.50 | 3.50 | 3.50 | 3.50 | 3.50 |
| Olfine E1010 [4] | 0.40 | 0.70 | 0.70 | 0.70 | 0.70 | 0.70 | 0.40 | 0.40 | 0.40 | 0.40 | 0.40 |
| Olfine PD002W [4] | 0.40 | 0.10 | 0.10 | 0.10 | 0.10 | 0.10 | 0.40 | 0.40 | 0.40 | 0.40 | 0.40 |
| Triethanol amine | | 0.40 | 0.40 | 0.40 | 0.40 | 0.40 | | | | | |
| Urea | 4.00 | 5.00 | 5.00 | 5.00 | 5.00 | 5.00 | 4.00 | 4.00 | 4.00 | 4.00 | 4.00 |
| Benzotriazole | 0.01 | 0.01 | 0.01 | 0.01 | 0.01 | 0.01 | 0.01 | 0.01 | 0.01 | 0.01 | 0.01 |
| Proxel XL-2 [5] | 0.30 | 0.30 | 0.30 | 0.30 | 0.30 | 0.30 | 0.30 | 0.30 | 0.30 | 0.30 | 0.30 |
| EDTA [6] | 0.02 | 0.02 | 0.02 | 0.02 | 0.02 | 0.02 | 0.02 | 0.02 | 0.02 | 0.02 | 0.02 |
| BYK-012 [7] | | 1.00 | | | | | 1.00 | | | | |
| BYK-019 [7] | | | 1.00 | | | | | 1.00 | | | |
| BYK-020 [7] | | | | | | | | | | | |
| BYK-025 [7] | | | | 1.00 | | | | | 1.00 | | |
| BYK-080 A [7] | | | | | | | | | | | |
| BYK-094 [7] | | | | | 1.00 | | | | | 1.00 | |

TABLE 2-continued

| | | | | | | | | | | | |
|---|---|---|---|---|---|---|---|---|---|---|---|
| BYK-1650 [7] | | | | | | | | | | | |
| BYK-1660 [7] | | | | | | | | | | | |
| Olfine SPC [8] | | | | | 1.00 | | | | | 1.00 | |
| Saffinol MD20 [9] | | | | | | | | | | | |
| StarFactant 20 [10] | 1.00 | | | | | | | | | | |
| Water | 67.17 | 68.27 | 68.27 | 68.27 | 68.27 | 68.27 | 67.17 | 67.17 | 67.17 | 67.17 | 67.17 |
| Total | 100.00 | 100.00 | 100.00 | 100.00 | 100.00 | 100.00 | 100.00 | 100.00 | 100.00 | 100.00 | 100.00 |

[1a] C.I. Acid Red 52
[1b] C.I. Direct Yellow 132
[2] Betaine-based surfactant represented by formula (3)
[3] Triethylene glycol monobutyl ether
[4] Acetylene glycol-based surfactant manufactured by Nissin Chemical Industry Co., Ltd.
[5] Antiseptic/antimold agent manufactured by Arch Chemicals, Inc.
[6] Disodium dihydrogen ethylenediamine tetraacetate dihydrate
[7] BYK Japan Ltd. (BYK-012 is a foam-controlling polymer-based defoaming agent, while the others are silicone-based defoaming agents)
[8] Acetylenediol-based defoaming agent manufactured by Nissin Chemical Industry Co., Ltd.
[9] Diacetylene tetraol manufactured by Air Products Japan Inc.
[10] Foam-controlling polymer-based defoaming agent manufactured by Cognis Japan Ltd.

Bubbling (foaming) and debubbling (defoaming) were evaluated by observing visually and observing changes in bubble height over time. More specifically, 10 g of the ink formulations of each of the examples and comparative examples were sealed in a cylindrical glass container having a diameter of 2 cm and height of 10 cm and mixed by shaking 50 times followed by evaluating foaming by measuring the height (H) to the maximum height of the bubbles, and evaluating defoaming based on the time until the height (H) from the interface between the bubbles and the liquid to the maximum height of the bubbles reached 0.5 H. (The experiment was carried out at an atmospheric temperature of 23 to 24° C.)

Static surface tension was measured using the so-called Wilhelmi plate method. The platinum plate used for measurement had a contact length of 28 mm, and resistance was measured when the platinum plate was taken out of a sample liquid in which it had been immersed. The measurement results described in Tables 4 to 6 were calculated based on a reference value of 72 mN/m for the measured value of pure water. Furthermore, detailed conditions were in compliance with JIS K 3362.

The maximum projection speed of the ink droplets at which the ink did not separate into 3 or more droplets either at the start of or during projection of ink droplets was taken to be the maximum stable projection speed as determined by filling each ink composition into an ink cartridge for an ink jet printer and changing the ink droplet projection speed by changing the strain rate of the piezo device. Similarly, the minimum projection speed of the ink droplets at which the ink did not separate into 3 or more droplets was taken to be the minimum stable projection speed. Both the maximum and minimum stable projection speeds were recorded, and the difference between the maximum stable projection speed and minimum stable projection speed were defined as a stable range.

The results are shown in Tables 3 to 5.

TABLE 3

| Composition | Examples | | | | | | | | | | | | | | | | | |
|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 |
| Foaming [1] (cm) | 5 | 6 | 2 | 2 | 3 | 4 | 7 | 5 | 7 | 6 | 4 | 2 | 4 | 2 | 5 | 2 | 4 | 3 |
| Defoaming [2] (min.) | 6 | 5 | 6 | 5 | 5 | 5 | 8 | 7 | 8 | 7 | 5 | 5 | 5 | 4 | 5 | 5 | 8 | 6 |
| Static surface tension (mN/m) | 24 | 24 | 23 | 22 | 30 | 24 | 24 | 24 | 23 | 24 | 23 | 24 | 22 | 22 | 30 | 30 | 23 | 23 |
| Maximum stable projection speed (m/s) | 11 | 11 | 10 | 10 | 15 | 10 | 11 | 11 | 11 | 11 | 10 | 10 | 10 | 10 | 15 | 15 | 10 | 10 |

TABLE 3-continued

| Composition | Examples | | | | | | | | | | | | | | | | | |
|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 |
| Minimum stable projection speed (m/s) | 5 | 5 | 4 | 4 | 5 | 5 | 5 | 5 | 5 | 5 | 4 | 4 | 4 | 4 | 5 | 5 | 5 | 5 |
| Stable range | 6 | 6 | 6 | 6 | 10 | 5 | 6 | 6 | 6 | 6 | 6 | 6 | 6 | 6 | 10 | 10 | 5 | 5 |

Experiment Conditions 10 g of sample ink were sealed in a cylindrical glass container having a diameter of 2 cm and height of 10 cm and mixed by shaking manually.
The experiment was carried out at a room temperature of 20 to 25° C.
[1] Result of measuring the height of bubbles formed immediately after manual shaking in cm units.
[2] Result of measuring amount of time required for the number of bubbles formed to decrease by half in minute units.

TABLE 4

| Composition | Examples | | | | | | | | | | | | | | | | | |
|---|---|---|---|---|---|---|---|---|---|---|---|---|---|---|---|---|---|---|
| No. | 19 | 20 | 21 | 22 | 23 | 24 | 25 | 26 | 27 | 28 | 29 | 30 | 31 | 32 | 33 | 34 | 35 | 36 |
| Foaming [1] (cm) | 6 | 7 | 3 | 2 | 2 | 3 | 6 | 5 | 7 | 5 | 4 | 2 | 3 | 2 | 5 | 3 | 4 | 4 |
| Defoaming [2] (min.) | 6 | 5 | 6 | 6 | 6 | 6 | 9 | 9 | 9 | 8 | 6 | 4 | 6 | 5 | 4 | 5 | 8 | 6 |
| Static surface tension (mN/m) | 24 | 24 | 22 | 22 | 30 | 24 | 23 | 23 | 24 | 24 | 24 | 24 | 22 | 23 | 23 | 23 | 23 | 23 |
| Maximum stable projection speed (m/s) | 11 | 11 | 10 | 10 | 15 | 10 | 11 | 11 | 11 | 11 | 10 | 10 | 10 | 10 | 15 | 15 | 10 | 10 |
| Minimum stable projection speed (m/s) | 5 | 5 | 4 | 4 | 5 | 5 | 5 | 5 | 5 | 5 | 4 | 4 | 4 | 4 | 5 | 5 | 5 | 5 |
| Stable range | 6 | 6 | 6 | 6 | 10 | 5 | 6 | 6 | 6 | 6 | 6 | 6 | 6 | 6 | 10 | 10 | 5 | 5 |

Experiment Conditions 10 g of sample ink were sealed in a cylindrical glass container having a diameter of 2 cm and height of 10 cm and mixed by shaking manually.
The experiment was carried out at a room temperature of 20 to 25° C.
[1] Result of measuring the height of bubbles formed immediately after manual shaking in cm units.
[2] Result of measuring amount of time required for the number of bubbles formed to decrease by half in minute units.

TABLE 5

| Composition | Examples | | | | | | | | | |
|---|---|---|---|---|---|---|---|---|---|---|
| No. | 37 | 38 | 39 | 40 | 41 | 42 | 43 | 44 | 45 | 46 |
| Foaming [1] (cm) | 8 | 9 | 8 | 9 | 9 | 9 | 9 | 9 | 8 | 8 |
| Defoaming [2] (min.) | 28 | 26 | 25 | 26 | 26 | 23 | 26 | 25 | 24 | 25 |
| Static surface tension (mN/m) | 23 | 23 | 23 | 24 | 31 | 24 | 24 | 23 | 23 | 31 |
| Maximum stable projection speed (m/s) | 10 | 10 | 10 | 10 | 15 | 10 | 10 | 10 | 10 | 15 |
| Minimum stable projection speed (m/s) | 4 | 4 | 4 | 4 | 4 | 4 | 4 | 4 | 4 | 4 |
| Stable range | 6 | 6 | 6 | 6 | 11 | 6 | 6 | 6 | 6 | 11 |

Experiment Conditions 10 g of sample ink were sealed in a cylindrical glass container having a diameter of 2 cm and height of 10 cm and mixed by shaking manually.
The experiment was carried out at a room temperature of 20 to 25° C.
[1] Result of measuring the height of bubbles formed immediately after manual shaking in cm units.
[2] Result of measuring amount of time required for the number of bubbles formed to decrease by half in minute units.

As a result of filling the ink compositions described in the above-mentioned examples into special-purpose cartridges and printing onto a dedicated ink jet recording medium (Crispia Photographic Paper <High Gloss> (Seiko Epson Corp.)) using the PM-G820 Ink Jet Printer (Seiko Epson Corp.), printing was able to be carried out satisfactorily.

EXAMPLE B

[Preparation of Ink Composition]

Each ink composition (Examples 1 to 24 and Comparative Examples 1 to 22) was prepared by mixing and dissolving each component at the formulation ratios shown in Tables 6 and 7 followed by subjecting to pressure filtration with a PTFE (polytetrafluoroethylene) filter having a pore diameter of 1 μm.

Furthermore, each component of the ink compositions shown in Tables 6 and 7 is indicated as the percent by weight of each component based on the total weight of the ink composition, and the balance of each composition is comprised of water.

In Tables 6 and 7, [1] represents a magenta dye represented by formula (5), [2] represents a magenta dye represented by the following formula (8), [3] represents a betaine-based surfactant represented by formula (1-1), [4] represents triethylene glycol monobutyl ether, [5] represents an acetylenediol-based surfactant manufactured by Nissin Chemical Industry Co., Ltd., [6] represents an antiseptic/anti-mold agent manufactured by Arch Chemicals, Inc., [7] represents disodium dihydrogen ethylenediamine tetraacetate dihydrate, [8] represents a defoaming agent manufactured by BYK Japan Ltd., [9] represents a defoaming agent manufactured by Nissin Chemical Industry Co., Ltd., [10] represents a defoaming agent manufactured by Air Products Japan Inc., and [11] represents a defoaming agent manufactured by Cognis Japan Ltd.

[C]

Formula (8)

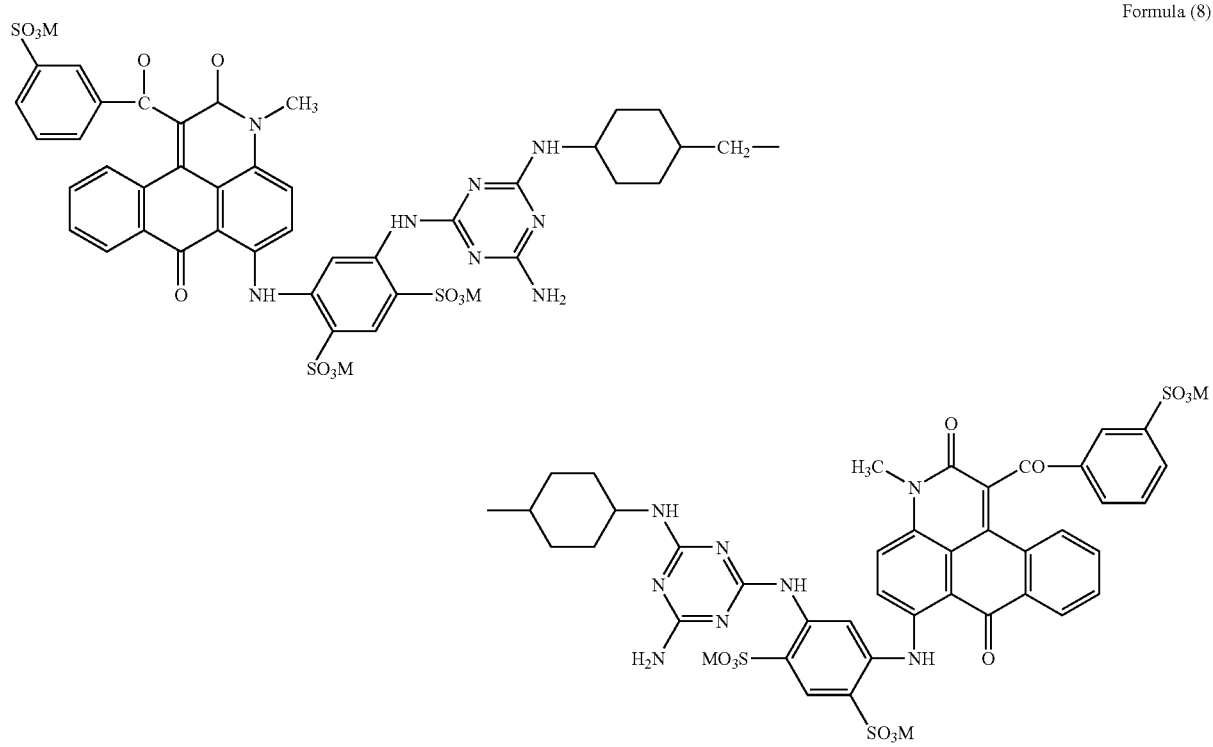

(M = NH$_4$ or Na)

TABLE 6

| Material | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Magenta dye [1] | 5.00 | 5.00 | 5.00 | 5.00 | 5.00 | 5.00 | 5.00 | 5.00 | 5.00 | 5.00 | 5.00 | 5.00 |
| Magenta dye 2 [2] | | | | | | | | | | | | |
| Betaine-based surfactant [3] | 1.00 | 1.00 | 1.00 | 1.00 | 1.00 | 1.00 | 1.00 | 1.00 | 1.00 | 1.00 | 1.00 | 1.00 |
| TEGmBE [4] | 9.00 | 9.00 | 9.00 | 9.00 | 9.00 | 9.00 | 9.00 | 9.00 | 9.00 | 9.00 | 9.00 | 9.00 |
| Glycerin | 9.00 | 9.00 | 9.00 | 9.00 | 9.00 | 9.00 | 9.00 | 9.00 | 9.00 | 9.00 | 9.00 | 9.00 |
| 2-pyrrolidone | 3.20 | 3.20 | 3.20 | 3.20 | 3.20 | 3.20 | 3.20 | 3.20 | 3.20 | 3.20 | 3.20 | 3.20 |

TABLE 6-continued

| Material | | | | | | | | | | | | |
|---|---|---|---|---|---|---|---|---|---|---|---|---|
| Olfine E1010 [5] | 0.70 | 0.70 | 0.70 | 0.70 | 0.70 | 0.70 | 0.70 | 0.70 | 0.70 | 0.70 | 0.70 | 0.70 |
| Olfine PD002W [5] | 0.10 | 0.10 | 0.10 | 0.10 | 0.10 | 0.10 | 0.10 | 0.10 | 0.10 | 0.10 | 0.10 | 0.10 |
| Triethanolamine | 0.40 | 0.40 | 0.40 | 0.40 | 0.40 | 0.40 | 0.40 | 0.40 | 0.40 | 0.40 | 0.40 | 0.40 |
| Urea | 5.00 | 5.00 | 5.00 | 5.00 | 5.00 | 5.00 | 5.00 | 5.00 | 5.00 | 5.00 | 5.00 | 5.00 |
| Benzotriazole | 0.01 | 0.01 | 0.01 | 0.01 | 0.01 | 0.01 | 0.01 | 0.01 | 0.01 | 0.01 | 0.01 | 0.01 |
| Proxel XL-2 [6] | 0.30 | 0.30 | 0.30 | 0.30 | 0.30 | 0.30 | 0.30 | 0.30 | 0.30 | 0.30 | 0.30 | 0.30 |
| EDTA [7] | 0.02 | 0.02 | 0.02 | 0.02 | 0.02 | 0.02 | 0.02 | 0.02 | 0.02 | 0.02 | 0.02 | 0.02 |
| BYK-012 [8] | | | | | | | | | | | | |
| BYK-019 [8] | | | | | | | | | | | | |
| BYK-020 [8] | 0.10 | 1.00 | | | | | | | | | | |
| BYK-025 [8] | | | | | | | | | | | | |
| BYK-080 A [8] | | | 0.10 | 1.00 | | | | | | | | |
| BYK-094 [8] | | | | | | | | | | | | |
| BYK-1650 [8] | | | | | 0.10 | 1.00 | | | | | | |
| BYK-1660 [8] | | | | | | | 0.10 | 1.00 | | | | |
| Olfine SPC [9] | | | | | | | | | | | | |
| Saffinol MD20 [10] | | | | | | | | | 0.10 | 1.00 | | |
| StarFactant 20 [11] | | | | | | | | | | | 0.10 | 1.00 |
| Water | 69.17 | 68.27 | 69.17 | 68.27 | 69.17 | 68.27 | 69.17 | 68.27 | 69.17 | 68.27 | 68.17 | 68.27 |
| Total | 100.00 | 100.00 | 100.00 | 100.00 | 100.00 | 100.00 | 100.00 | 100.00 | 100.00 | 100.00 | 100.00 | 100.00 |

| | Comparative Examples | | | | | | | | | | |
|---|---|---|---|---|---|---|---|---|---|---|---|
| Material | 1 | 2 | 3 | 4 | 5 | 6 | 7 | 8 | 9 | 10 | 11 |
| Magenta dye [1] | 5.00 | 5.00 | 5.00 | 5.00 | 5.00 | | | | | | 5.00 |
| Magenta dye 2 [2] | | | | | | 5.00 | 5.00 | 5.00 | 5.00 | 5.00 | |
| Betaine-based surfactant [3] | 1.00 | 1.00 | 1.00 | 1.00 | 1.00 | 1.00 | 1.00 | 1.00 | 1.00 | 1.00 | |
| TEGmBE [4] | 9.00 | 9.00 | 9.00 | 9.00 | 9.00 | 9.00 | 9.00 | 9.00 | 9.00 | 9.00 | 9.00 |
| Glycerin | 9.00 | 9.00 | 9.00 | 9.00 | 9.00 | 9.00 | 9.00 | 9.00 | 9.00 | 9.00 | 9.00 |
| 2-pyrrolidone | 3.20 | 3.20 | 3.20 | 3.20 | 3.20 | 3.20 | 3.20 | 3.20 | 3.20 | 3.20 | 3.20 |
| Olfine E1010 [5] | 0.70 | 0.70 | 0.70 | 0.70 | 0.70 | 0.70 | 0.70 | 0.70 | 0.70 | 0.70 | 0.70 |
| Olfine PD002W [5] | 0.10 | 0.10 | 0.10 | 0.10 | 0.10 | 0.10 | 0.10 | 0.10 | 0.10 | 0.10 | 0.10 |
| Triethanolamine | 0.40 | 0.40 | 0.40 | 0.40 | 0.40 | 0.40 | 0.40 | 0.40 | 0.40 | 0.40 | 0.40 |
| Urea | 5.00 | 5.00 | 5.00 | 5.00 | 5.00 | 5.00 | 5.00 | 5.00 | 5.00 | 5.00 | 5.00 |
| Benzotriazole | 0.01 | 0.01 | 0.01 | 0.01 | 0.01 | 0.01 | 0.01 | 0.01 | 0.01 | 0.01 | 0.01 |
| Proxel XL-2 [6] | 0.30 | 0.30 | 0.30 | 0.30 | 0.30 | 0.30 | 0.30 | 0.30 | 0.30 | 0.30 | 0.30 |
| EDTA [7] | 0.02 | 0.02 | 0.02 | 0.02 | 0.02 | 0.02 | 0.02 | 0.02 | 0.02 | 0.02 | 0.02 |
| BYK-012 [8] | 1.00 | | | | | 1.00 | | | | | |
| BYK-019 [8] | | 1.00 | | | | | 1.00 | | | | |
| BYK-020 [8] | | | | | | | | | | | |
| BYK-025 [8] | | | 1.00 | | | | | 1.00 | | | |
| BYK-080 A [8] | | | | | | | | | | | |

TABLE 6-continued

| Material | | | | | | | | | | | |
|---|---|---|---|---|---|---|---|---|---|---|---|
| BYK-094 [8] | | | 1.00 | | | | | 1.00 | | | |
| BYK-1650 [8] | | | | | | | | | | | |
| BYK-1660 [8] | | | | | | | | | | | |
| Olfine SPC [9] | | | | 1.00 | | | | | 1.00 | | |
| Saffinol MD20 [10] | | | | | | | | | | | |
| StarFactant 20 [11] | | | | | | | | | | | |
| Water | 68.27 | 68.27 | 68.27 | 68.27 | 68.27 | 65.27 | 65.27 | 65.27 | 65.27 | 65.27 | 67.27 |
| Total | 100.00 | 100.00 | 100.00 | 100.00 | 100.00 | 100.00 | 100.00 | 100.00 | 100.00 | 100.00 | 100.00 |

TABLE 7

| Material | 13 | 14 | 15 | 16 | 17 | 18 | 19 | 20 | 21 | 22 | 23 | 24 |
|---|---|---|---|---|---|---|---|---|---|---|---|---|
| Magenta dye [1] | 0.50 | 0.50 | 0.50 | 0.50 | 0.50 | 0.50 | 0.50 | 0.50 | 0.50 | 0.50 | 0.50 | 0.50 |
| Magenta dye 2 [2] | | | | | | | | | | | | |
| Betaine-based surfactant [3] | 0.60 | 0.60 | 0.60 | 0.60 | 0.60 | 0.60 | 0.60 | 0.60 | 0.60 | 0.60 | 0.60 | 0.60 |
| TEGmBE [4] | 9.00 | 9.00 | 9.00 | 9.00 | 9.00 | 9.00 | 9.00 | 9.00 | 9.00 | 9.00 | 9.00 | 9.00 |
| Glycerin | 13.00 | 13.00 | 13.00 | 13.00 | 13.00 | 13.00 | 13.00 | 13.00 | 13.00 | 13.00 | 13.00 | 13.00 |
| 2-pyrrolidone | 3.50 | 3.50 | 3.50 | 3.50 | 3.50 | 3.50 | 3.50 | 3.50 | 3.50 | 3.50 | 3.50 | 3.50 |
| Olfine E1010 [5] | 0.40 | 0.40 | 0.40 | 0.40 | 0.40 | 0.40 | 0.40 | 0.40 | 0.40 | 0.40 | 0.40 | 0.40 |
| Olfine PD002W [5] | 0.40 | 0.40 | 0.40 | 0.40 | 0.40 | 0.40 | 0.40 | 0.40 | 0.40 | 0.40 | 0.40 | 0.40 |
| Urea | 4.00 | 4.00 | 4.00 | 4.00 | 4.00 | 4.00 | 4.00 | 4.00 | 4.00 | 4.00 | 4.00 | 4.00 |
| Benzotriazole | 0.01 | 0.01 | 0.01 | 0.01 | 0.01 | 0.01 | 0.01 | 0.01 | 0.01 | 0.01 | 0.01 | 0.01 |
| Proxel XL-2 [6] | 0.30 | 0.30 | 0.30 | 0.30 | 0.30 | 0.30 | 0.30 | 0.30 | 0.30 | 0.30 | 0.30 | 0.30 |
| EDTA [7] | 0.02 | 0.02 | 0.02 | 0.02 | 0.02 | 0.02 | 0.02 | 0.02 | 0.02 | 0.02 | 0.02 | 0.02 |
| BYK-012 [8] | | | | | | | | | | | | |
| BYK-019 [8] | | | | | | | | | | | | |
| BYK-020 [8] | 0.10 | 1.00 | | | | | | | | | | |
| BYK-025 [8] | | | | | | | | | | | | |
| BYK-080 A [8] | | | 0.10 | 1.00 | | | | | | | | |
| BYK-094 [8] | | | | | | | | | | | | |
| BYK-1650 [8] | | | | | 0.10 | 1.00 | | | | | | |
| BYK-1660 [8] | | | | | | | 0.10 | 1.00 | | | | |
| Olfine SPC [9] | | | | | | | | | | | | |
| Saffinol MD20 [10] | | | | | | | | | 0.10 | 1.00 | | |
| StarFactant 20 [11] | | | | | | | | | | | 0.10 | 1.00 |
| Water | 68.07 | 67.17 | 68.07 | 67.17 | 68.07 | 67.17 | 68.07 | 67.17 | 68.07 | 67.17 | 68.07 | 67.17 |
| Total | 100.0 | 100.0 | 100.0 | 100.0 | 100.0 | 100.0 | 100.0 | 100.0 | 100.0 | 100.0 | 100.0 | 100.0 |

TABLE 7-continued

| Material | Comparative Examples | | | | | | | | | | |
|---|---|---|---|---|---|---|---|---|---|---|---|
| | 12 | 13 | 14 | 15 | 16 | 17 | 18 | 19 | 20 | 21 | 22 |
| Magenta dye [1] | 0.50 | 0.50 | 0.50 | 0.50 | 0.50 | | | | | | 0.50 |
| Magenta dye 2 [2] | | | | | | 0.50 | 0.50 | 0.50 | 0.50 | 0.50 | |
| Betaine-based surfactant [3] | 0.60 | 0.60 | 0.60 | 0.60 | 0.60 | 0.60 | 0.60 | 0.60 | 0.60 | 0.60 | |
| TEGmBE [4] | 9.00 | 9.00 | 9.00 | 9.00 | 9.00 | 9.00 | 9.00 | 9.00 | 9.00 | 9.00 | 9.00 |
| Glycerin | 13.00 | 13.00 | 13.00 | 13.00 | 13.00 | 13.00 | 13.00 | 13.00 | 13.00 | 13.00 | 13.00 |
| 2-pyrrolidone | 3.50 | 3.50 | 3.50 | 3.50 | 3.50 | 3.50 | 3.50 | 3.50 | 3.50 | 3.50 | 3.50 |
| Olfine E1010 [5] | 0.40 | 0.40 | 0.40 | 0.40 | 0.40 | 0.40 | 0.40 | 0.40 | 0.40 | 0.40 | 0.40 |
| Olfine PD002W [5] | 0.40 | 0.40 | 0.40 | 0.40 | 0.40 | 0.40 | 0.40 | 0.40 | 0.40 | 0.40 | 0.40 |
| Urea | 4.00 | 4.00 | 4.00 | 4.00 | 4.00 | 4.00 | 4.00 | 4.00 | 4.00 | 4.00 | 4.00 |
| Benzotriazole | 0.01 | 0.01 | 0.01 | 0.01 | 0.01 | 0.01 | 0.01 | 0.01 | 0.01 | 0.01 | 0.01 |
| Proxel XL-2 [6] | 0.30 | 0.30 | 0.30 | 0.30 | 0.30 | 0.30 | 0.30 | 0.30 | 0.30 | 0.30 | 0.30 |
| EDTA [7] | 0.02 | 0.02 | 0.02 | 0.02 | 0.02 | 0.02 | 0.02 | 0.02 | 0.02 | 0.02 | 0.02 |
| BYK-012 [8] | 1.00 | | | | | 1.00 | | | | | |
| BYK-019 [8] | | 1.00 | | | | | 1.00 | | | | |
| BYK-020 [8] | | | | | | | | | | | |
| BYK-025 [8] | | | 1.00 | | | | | 1.00 | | | |
| BYK-080 A [8] | | | | | | | | | | | |
| BYK-094 [8] | | | | 1.00 | | | | | 1.00 | | |
| BYK-1650 [8] | | | | | | | | | | | |
| BYK-1660 [8] | | | | | | | | | | | |
| Olfine SPC [9] | | | | | 1.00 | | | | | 1.00 | |
| Saffinol MD20 [10] | | | | | | | | | | | |
| StarFactant 20 [11] | | | | | | | | | | | |
| Water | 67.17 | 67.17 | 67.17 | 67.17 | 67.17 | 67.27 | 67.27 | 67.27 | 67.27 | 68.27 | 68.87 |
| Total | 100.0 | 100.0 | 100.0 | 100.0 | 100.0 | 100.00 | 100.00 | 100.00 | 100.00 | 100.00 | 100.00 |

Test Example 1

Foaming/Defoaming Test

Bubbling (foaming) and debubbling (defoaming) were measured by observing visually and observing changes in bubble height over time. More specifically, 10 g of the ink formulations of each of the examples and comparative examples were sealed in a cylindrical glass container having a diameter of 2 cm and height of 10 cm and mixed by shaking 50 times followed by measuring the height (H) from the interface between the bubbles and liquid to the maximum height of the bubbles, and using as the value of "foaming" that indicates the ease of bubbling of the ink compositions. Continuously, the time (minutes) required for the height (H) from the interface between the bubbles and the liquid to the maximum height of the bubbles to reach 0.5H was measured, and used as the value of "defoaming" that indicates the ease of debubbling of the ink compositions. (The experiment was carried out at an atmospheric temperature of 23 to 24° C.) The results are shown in Tables 8 and 9.

Test Example 2

Measurement of Static Surface Tension

Static surface tension was measured using the so-called Wilhelmi plate method. The platinum plate used for measurement had a contact length of 28 mm, and resistance was measured when the platinum plate was taken out of a sample liquid in which it had been immersed. The measurement results described in Tables 8 and 9 were calculated based on a reference value of 72 mN/m for the measured value of pure water. Furthermore, detailed conditions were in compliance with JIS K 3362. The results are shown in Tables 8 and 9.

Test Example 3

Ink Droplet Projection Stability Test

Each ink composition was recorded onto a recording medium while changing the ink droplet projection speed by changing the strain rate of the piezo device using the PM- A700 Ink Jet Printer (PM-A750 manufactured by Seiko Epson Corp., under the condition of a temperature of 25° C., small dot waveform) after having filled each ink composition into an ink cartridge for an ink jet printer.

Here, the maximum projection speed of the ink droplets at which the ink did not separate into 3 or more droplets either at the start of or during projection of ink droplets was recorded as the maximum stable projection speed (m/s), while similarly, the minimum projection speed of the ink droplets at which the ink did not separate into 3 or more droplets was recorded as the minimum stable projection speed (m/s), and the difference between the maximum stable projection speed and the minimum stable projection speed was defined as the stable range. The results are shown in Tables 3 and 4.

TABLE 8

| | Examples | | | | | | | | | | | |
|---|---|---|---|---|---|---|---|---|---|---|---|---|
| Test Example | 1 | 2 | 3 | 4 | 5 | 6 | 7 | 8 | 9 | 10 | 11 | 12 |
| 1 Foaming (cm) | 7 | 5 | 7 | 6 | 4 | 2 | 4 | 2 | 5 | 2 | 4 | 3 |
| Defoaming (min.) | 8 | 7 | 8 | 7 | 5 | 4 | 5 | 4 | 5 | 5 | 8 | 6 |
| 2 Static surface tension (mN/m) | 24 | 24 | 26 | 25 | 23 | 23 | 22 | 22 | 30 | 30 | 22 | 22 |
| 3 Maximum stable projection speed (m/s) | 11 | 11 | 11 | 11 | 10 | 10 | 10 | 10 | 15 | 15 | 10 | 10 |
| Minimum stable projection speed (m/s) | 5 | 5 | 5 | 5 | 4 | 4 | 4 | 4 | 5 | 5 | 5 | 5 |
| Stable range | 6 | 6 | 6 | 6 | 6 | 6 | 6 | 6 | 10 | 10 | 5 | 5 |
| 4 Light resistance | 7 | 7 | 7 | 7 | 7 | 7 | 7 | 7 | 7 | 7 | 7 | 7 |
| 5 Moisture resistance | 4 | 4 | 4 | 4 | 4 | 4 | 4 | 4 | 4 | 4 | 4 | 4 |

| | Comparative Examples | | | | | | | | | | |
|---|---|---|---|---|---|---|---|---|---|---|---|
| Test Example | 1 | 2 | 3 | 4 | 5 | 6 | 7 | 8 | 9 | 10 | 11 |
| 1 Foaming (cm) | 8 | 9 | 8 | 9 | 9 | 8 | 9 | 8 | 9 | 9 | 2 |
| Defoaming (min.) | 28 | 26 | 25 | 26 | 26 | 28 | 26 | 25 | 25 | 25 | 4 |
| 2 Static surface tension (mN/m) | 25 | 27 | 25 | 26 | 31 | 25 | 26 | 25 | 26 | 30 | 32 |
| 3 Maximum stable projection speed (m/s) | 10 | 10 | 10 | 10 | 15 | 10 | 11 | 10 | 10 | 14 | 13 |
| Minimum stable projection speed (m/s) | 4 | 4 | 4 | 4 | 4 | 4 | 4 | 4 | 4 | 4 | |
| Stable range | 6 | 6 | 6 | 6 | 11 | 6 | 7 | 6 | 6 | 10 | 9 |
| 4 Light resistance | 7 | 7 | 7 | 7 | 7 | 2 | 2 | 2 | 2 | 2 | 5 |
| 5 Moisture resistance | 4 | 4 | 4 | 4 | 4 | 3 | 3 | 3 | 3 | 3 | 1 |

TABLE 9

| | Examples | | | | | | | | | | | |
|---|---|---|---|---|---|---|---|---|---|---|---|---|
| Test Example | 13 | 14 | 15 | 16 | 17 | 18 | 19 | 20 | 21 | 22 | 23 | 24 |
| 1 Foaming (cm) | 6 | 5 | 7 | 5 | 4 | 2 | 3 | 2 | 5 | 3 | 4 | 4 |
| Defoaming (min.) | 9 | 9 | 9 | 8 | 6 | 4 | 6 | 5 | 4 | 5 | 8 | 6 |
| 2 Static surface tension (mN/m) | 25 | 24 | 24 | 24 | 22 | 21 | 22 | 21 | 29 | 29 | 23 | 23 |
| 3 Maximum stable projection speed (m/s) | 11 | 11 | 11 | 11 | 10 | 10 | 10 | 10 | 15 | 15 | 10 | 10 |
| Minimum stable projection speed (m/s) | 5 | 5 | 5 | 5 | 4 | 4 | 4 | 4 | 5 | 5 | 5 | 5 |
| Stable range | 6 | 6 | 6 | 6 | 6 | 6 | 6 | 6 | 10 | 10 | 5 | 5 |
| 4 Light resistance | 6 | 6 | 6 | 6 | 6 | 6 | 6 | 6 | 6 | 6 | 6 | 6 |
| 5 Moisture resistance | 4 | 4 | 4 | 4 | 4 | 4 | 4 | 4 | 4 | 4 | 4 | 4 |

| | Comparative Examples | | | | | | | | | | |
|---|---|---|---|---|---|---|---|---|---|---|---|
| Test Example | 12 | 13 | 14 | 15 | 16 | 17 | 18 | 19 | 20 | 21 | 22 |
| 1 Foaming (cm) | 9 | 9 | 9 | 8 | 8 | 9 | 9 | 9 | 8 | 8 | 2 |
| Defoaming (min.) | 23 | 26 | 25 | 24 | 25 | 23 | 26 | 25 | 25 | 26 | 5 |
| 2 Static surface tension (mN/m) | 25 | 26 | 25 | 25 | 30 | 25 | 26 | 26 | 25 | 30 | 32 |
| 3 Maximum stable projection speed (m/s) | 10 | 10 | 10 | 10 | 15 | 11 | 11 | 10 | 10 | 15 | 15 |
| Minimum stable projection speed (m/s) | 4 | 4 | 4 | 4 | 4 | 4 | 4 | 4 | 4 | 4 | 4 |
| Stable range | 6 | 6 | 6 | 6 | 11 | 7 | 7 | 6 | 6 | 11 | 11 |
| 4 Light resistance | 6 | 6 | 6 | 6 | 6 | 2 | 2 | 2 | 2 | 2 | 4 |
| 5 Moisture resistance | 4 | 4 | 4 | 4 | 4 | 3 | 3 | 3 | 3 | 3 | 1 |

As a result of filling the ink compositions described in the above-mentioned examples into special-purpose cartridges and printing onto a dedicated ink jet recording medium (Crispia Photographic Paper <High Gloss> (Seiko Epson Corp.)) using the PM-A700 Ink Jet Printer (Seiko Epson Corp.), printing was able to be carried out satisfactorily.

Among the ink compositions demonstrating superior foaming and defoaming properties as described above, Saffinol MD20 was clearly determined to be particularly superior as a defoaming agent that yields a broad stable projection range. On the other hand, although ink compositions of the comparative examples (Comparative Examples 5 and 10) that used an acetylenediol-based defoaming agent in the form of Olfine SPC secured an adequate stable projection range, foaming and defoaming properties were inferior.

Test Example 4

Evaluation of Light Resistance

A printing test was carried out using the PM-A750™ Ink Jet Printer (Seiko Epson Corp.). The ink compositions of Examples 1 to 24 and Comparative Examples 1 to 22 were respectively filled into special-purpose magenta ink jet cartridges for use with this printer, and printed onto a dedicated ink jet recording medium (Crispia Photographic Paper <High Gloss> (Seiko Epson Corp.)) to obtain recorded articles. The printing configuration consisted of printing with magenta only, and the optical density (hereinafter referred to as OD) of the resulting images was adjusted so as to be within a density range of 0.9 to 1.1. The resulting recorded articles were dried for about 1 day at room temperature to obtain the desired recorded articles.

The light resistance test consisted of irradiating the recorded articles with light under conditions consisting of a temperature of 24° C., humidity of 60% RH and luminosity of 70000 lux using the SFT-II fluorescent light resistance tester (trade name, Suga Test Instruments Co., Ltd.). OD values of the recorded articles before and after irradiating with light were then measured using the Spectrolino™ reflection densitometer (trade name, Gretag Ltd.). The relict optical density (hereinafter referred to as ROD) was then calculated from the resulting OD values using the equation below. Furthermore, measurement of OD values was carried out using a D50 light source in the absence of a light source filter and absolute white for the white standard at a view angle of 2°:

$ROD(\%) = (Dn/Do) \times 100$ (wherein, Dn indicates the OD value of the image after completion of the light irradiation test, while Do indicates the OD value of the image before the start of the light irradiation test).

Moreover, the light resistance of each color recorded on the recorded articles was evaluated using the following evaluation criteria based on the results of the above test. Those results are shown in Tables 8 and 9. Furthermore, in this test, the smaller the decrease in ROD of the recorded article, the lower the deterioration of the image even if exposed to fluorescent light for an extended period of time.

(Evaluation Criteria)
Level 1: ROD decreased to 70% in 11 days
Level 2: ROD decreased to 70% in more than 11 to 21 days
Level 3: ROD decreased to 70% in more than 22 to 32 days
Level 4: ROD decreased to 70% in more than 33 to 43 days
Level 5: ROD decreased to 70% in more than 44 to 54 days
Level 6: ROD decreased to 70% in more than 55 to 65 days
Level 7: ROD decreased to 70% in more than 66 to 76 days
Level 8: ROD decreased to 70% in more than 77 days Test Example 5

Evaluation of Moisture Resistance

A printing test was carried out using the PM-A750™ Ink Jet Printer (trade name, Seiko Epson Corp.). The ink compositions of Examples 1 to 32 and Comparative Examples 1 to 66 were respectively filled into a special-purpose magenta ink cartridge for use with this printer, and printed onto a dedicated ink jet recording medium (Crispia Photographic Paper <High Gloss> (Seiko Epson Corp.)) to obtain recorded articles. The printing configuration consisted of printing with magenta only to obtain the maximum optical density. Moisture resistance was then evaluated using the resulting samples. After allowing each sample to stand undisturbed for 4 days in environment at 40° C. and 85% RH in the absence of light, the degree of bleeding of characters and outline characters was evaluated visually. The moisture resistance of each sample was then evaluated based on the evaluation criteria indicated below. Those results are shown in Tables 8 and 9.

(Evaluation Criteria)
Level 1: Remarkable bleeding of colorant, illegible characters and outline characters
Level 2: Some bleeding of colorant, increased character width and outline characters filled in
Level 3: Some bleeding of colorant, disturbance of character borders
Level 4: Slight bleeding of colorant, some disturbance of character borders
Level 5: Hardly any bleeding of colorant observed
Level 6: No bleeding of colorant observed The ink composition of the present invention can be used as a particularly preferably ink for an ink jet printer. In addition, the ink jet recording method of the present invention can be used an ink jet recording method for recording onto various recording media. Moreover, the recorded article of the present invention can be used as a recorded article on which various information is recorded.

What is claimed is:

1. An ink composition comprising: a colorant, a betaine-based surfactant represented by the following formula (1) and a defoaming agent:

$(R)_p\text{-N-}[L\text{-}(COOM)_q]_r$ (Formula 1)

wherein, R represents a hydrogen atom, alkyl group, aryl group or heterocyclic group; L represents a divalent or more linking group; M represents a hydrogen atom, alkali metal atom, ammonium group, protonated organic amine or nitrogen-containing heterocyclic group or quaternary ammonium ion group, or represents a group that does not exist as a cation in the case of being a counter ion of an ammonium ion comprising an N atom in formula (1); q represents an integer of 1 or more; r represents an integer of 1 to 4; p represents an integer of 0 to 4; p+r is 3 or 4; N is a nitrogen atom that composes a quaternary amine in the case where p+r is 4; R may be the same or different when p is 2 or more; COOM may be the same or different when q is 2 or more; and $L\text{-}(COOM)_q$ may be the same or different when r is 2 or more, wherein the defoaming agent is a diacetylene tetraol represented by the following general formula (3):

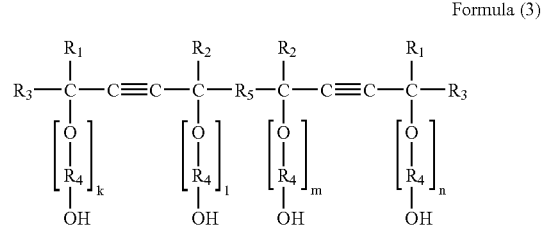

Formula (3)

wherein, $R_1$ and $R_2$ each independently represent an alkyl group having 1 to 8 carbon atoms: $R_3$ each independently represent a hydrogen atom or a methyl group; —O—$R_4$— each independently represent an oxyethyl, oxypropyl or oxybutyl group; $R_5$ represents a divalent linking group, and k, l, m and n respectively represent an integer of 1 to 100.

2. The ink composition according to claim 1, wherein the betaine-based surfactant represented by formula (1) is a compound represented by the following general formula (1-1):

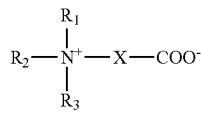

Formula (1-1)

wherein, $R_1$ to $R_3$ represent an alkyl group having 1 to 20 carbon atoms, and X represents a divalent linking group.

3. The ink composition according to claim 1, wherein the betaine-based surfactant represented by formula (1) is a compound represented by the following formula (1-2)

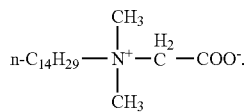

Formula (1-2)

4. The ink composition according to claim 1, wherein the content of the defoaming agent is 0.1 to 1.0% by weight.

5. The ink composition according to claim 1, wherein the ratio of the content of the defoaming agent to the content of the betaine-hased surfactant is a weight ratio of 1:0.1 to 1:1.7.

6. The ink composition according to claim 1, wherein the colorant is a magenta dye represented by the following general formula (2) and the defoaming agent is represented by the following general formula (3):

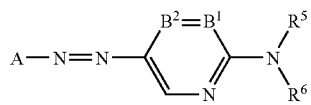

Formula (2)

wherein, A represents a residue of a five-member heterocyclic diazo component A-NH$_2$; $B^1$ and $B^2$ each represent —CR$^1$= or —CR$^2$= or one represents a nitrogen atom and the other represents —CR$^1$= or —CR$^3$=; $R^5$ and $R^6$ each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group, each group may further have a substituent; G, $R^1$ and $R^2$ each independently represent a hydrogen atom, halogen atom, aliphatic group, aromatic group, heterocyclic group, cyano group. carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, amino group substituted with an alkyl group, aryl group or heterocyclic group, acylamino group, ureido group, sulfamoylamino group, alkoxycarbonylamino group, aryl oxycarbonylamino group, alkyl and arylsulfonylamino group, aryloxycarbonylamino group, nitro group, alkyl and arylthio group. alkyl and arylsulfonyl group, alkyl and arylsulfinyl group, sulfamoyl group, sulfo group or heterocyclic thio group, each group may be further substituted; and $R^1$ and $R^5$ or $R^1$ and $R^3$ may be bonded to form a five- to six-member ring;

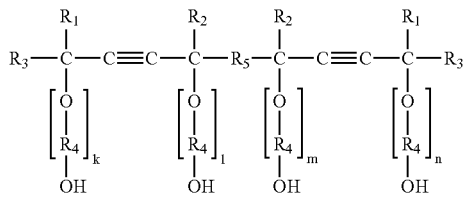

Formula (3)

wherein $R_1$ and $R_2$ respectively and independently represent an alkyl group having 1 to 8 carbon atoms; $R^3$ each independently represents a hydrogen atom or a methyl group; —O—$R_4$— each independently represent an oxyethyl, oxypropyl or oxybutyl group; $R_5$ represents a divalent linking group; and k, l, m and n respectively represent an integer of 1 to 100.

7. The ink composition according to claim 6, wherein the content of the defoaming agent is 0.1 to 1.0% by weight.

8. The ink composition according to claim 6, wherein the ratio of the content of the defoaming agent to the content of the betaine-based surfactant is a weight ratio of 1:0.1 to 1:1.7.

9. The ink composition according to claim 6, wherein the magenta dye represented by the general formula (2) is a magenta dye represented by the following general formula (4):

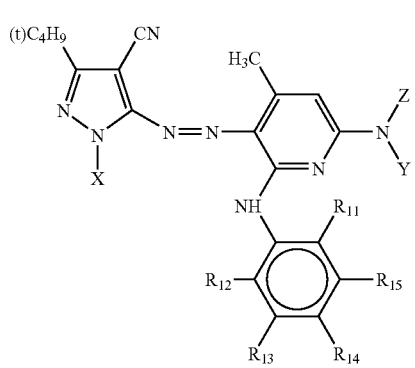

Formula (4)

wherein, $R_{11}$ and $R_{12}$ each independently represent an alkyl group, alkoxy group or halogen atom, and when $R_{11}$ and $R_{12}$ are both alkyl groups, the total number of carbon atoms that compose the alkyl groups is 3 or more and these groups may be further substituted; $R_{13}$, $R_{14}$ and $R_{15}$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group, each group may be further substituted; $R_{11}$ and $R_{15}$ or $R_{12}$ and $R_{13}$ may be mutually condensed into a ring; X represents a hydrogen atom, aliphatic group, aromatic group or heterocyclic group; Y and Z each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group, and each group may further have a substituent.

10. The ink composition according to claim 6, wherein the magenta dye represented by the general formula (2) is a magenta dye represented by the following general formula (5):

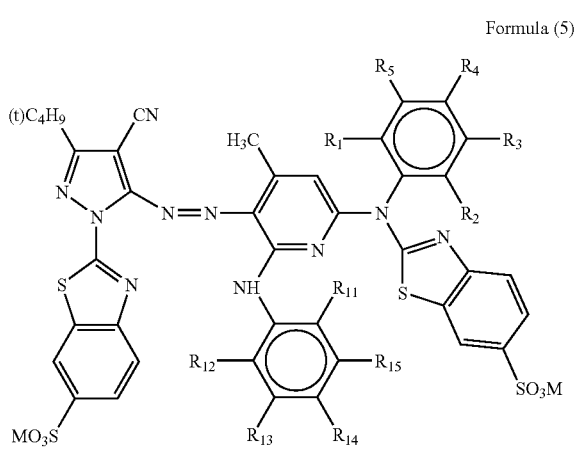

Formula (5)

wherein, $R_1$ and $R_2$ each independently represent an alkyl group, alkoxy group or halogen atom, and when both $R_1$ and $R_2$ are alkyl groups, the total number of carbon atoms that compose the alkyl groups is 3 or more and these groups may be further substituted; $R_3$, $R_4$ and $R_5$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group, each group may be further substituted; $R_1$, $R_5$ or $R_2$ and $R_3$ may be mutually condensed into a ring; $R_{11}$ and $R_{12}$ each independently represent an alkyl group, alkoxy group or halogen atom, and when $R_{11}$ and $R_{12}$ are both alkyl groups, the total number of carbon atoms that compose the alkyl groups is 3 or more and these may be further substituted; $R_{13}$, $R_{14}$ and $R_{15}$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group, each group may be further substituted; $R_{11}$ and $R_{15}$ or $R_{12}$ and $R_{13}$ may be mutually condensed into a ring; and M represents hydrogen, lithium, sodium, potassium, ammonium or an organic amine.

11. The ink composition according to claim 6, wherein the magenta dye represented by the general formula (2) is a magenta dye represented by the following formula (6);

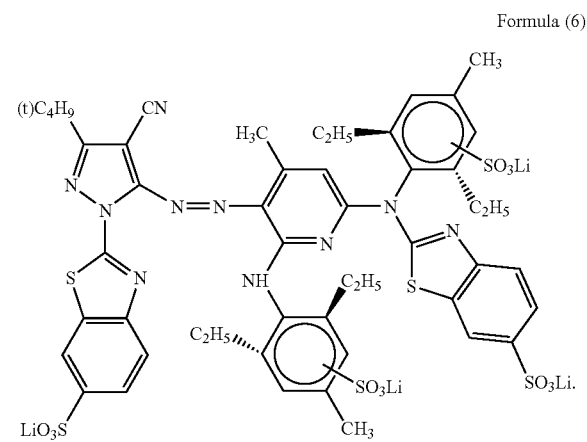

Formula (6)

12. The ink composition according to claim 6, wherein the content of magenta dye is 0.50 to 5.00% by weight based on the total weight of the ink composition.

13. The ink composition according to claim 6, wherein the betaine-based surfactant represented by the general formula (1) is a compound represented by the following general formula (1-1):

Formula (1-1)

wherein, $R_1$ to $R_3$ represent an alkyl group having 1 to 20 carbon atoms, and X represents a divalent linking group.

14. The ink composition according to claim 6, wherein the betaine-based surfactant represented by the general formula (1) is a compound represented by the following formula (1-2)

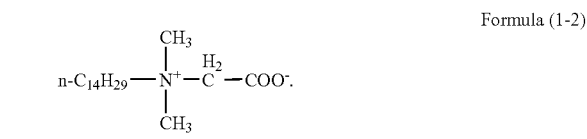

Formula (1-2)

15. The ink composition according to claim 6, wherein the ratio of the content of the betaine-based surfactant to the content of the magenta dye is a weight ratio of 1:10 to 1:0.13.

16. The An ink jet recording method comprising providing the ink composition according to claim 1, and discharging liquid droplets of the ink composition so that the liquid droplets are adhered to a recording medium.

17. The ink jet recording method according to claim 16, wherein the liquid droplets are discharged from an ink jet head that forms the ink droplets by mechanical deformation of a piezoelectric device.

18. An ink cartridge filled with the ink composition according to 1.

19. An ink jet recording method, comprising depositing droplets of the ink composition according to claim 2 onto a recording medium.

20. A recorded article, which is recorded by the ink jet recording method according to claim 19.

* * * * *

UNITED STATES PATENT AND TRADEMARK OFFICE
CERTIFICATE OF CORRECTION

| | | |
|---|---|---|
| PATENT NO. | : 7,553,357 B2 | Page 1 of 1 |
| APPLICATION NO. | : 11/800659 | |
| DATED | : June 30, 2009 | |
| INVENTOR(S) | : Akihito Sao et al. | |

It is certified that error appears in the above-identified patent and that said Letters Patent is hereby corrected as shown below:

On the title page, item [73]: assignee, "IKO" should read -- SEIKO --.

Signed and Sealed this
Twenty-fourth Day of May, 2011

David J. Kappos
*Director of the United States Patent and Trademark Office*